United States Patent [19]

Menzinger et al.

[11] Patent Number: 5,441,890
[45] Date of Patent: * Aug. 15, 1995

[54] DYNAMICAL DESTABILIZATION OF SYSTEMS CHARACTERIZED BY KINETICALLY COUPLED COMPONENTS USING A DIFFERENTIAL FLOW

[75] Inventors: Michael Menzinger, 46 Brunswick Avenue, Toronto, Ontario, Canada, M5S 2L7; Arkady Rovinsky, Toronto, Canada

[73] Assignees: Michael Menzinger; Arkady B. Rovinsky, both of Toronto, Canada

[*] Notice: The portion of the term of this patent subsequent to Jul. 26, 2011 has been disclaimed.

[21] Appl. No.: 68,706

[22] Filed: May 28, 1993

Related U.S. Application Data

[63] Continuation-in-part of Ser. No. 932,560, Aug. 20, 1992, Pat. No. 5,332,677.

[51] Int. Cl.$^6$ .................. G01N 33/00; G01N 37/00
[52] U.S. Cl. .................. 436/35; 73/23.24; 422/68.1; 422/211
[58] Field of Search .............. 436/35, 161, 175, 178; 73/23.24, 23.41, 61.52; 331/117 FE; 422/56, 59, 68.1, 211

[56] References Cited

U.S. PATENT DOCUMENTS

| | | | |
|---|---|---|---|
| 3,534,294 | 10/1970 | Aver . | |
| 4,123,448 | 10/1978 | Kleinpeter | 422/212 |
| 4,515,896 | 5/1985 | Melton | 436/35 X |
| 4,603,109 | 7/1986 | Lilo | 422/192 |
| 4,832,914 | 5/1989 | Tam et al. | 422/130 |
| 4,968,484 | 11/1990 | Nosticzius | 422/68.1 |
| 4,971,605 | 11/1990 | Tarman | 95/96 |
| 5,196,126 | 3/1993 | O'Dowd | 422/37 |
| 5,289,139 | 2/1994 | Fiedziuszko et al. | 331/117 |

FOREIGN PATENT DOCUMENTS 1154933  10/1983  Canada .

OTHER PUBLICATIONS

Agladze et al., "Autowave propagation in a B–Z medium with immobilized catalyst stationary flow of Reagents"., *Z. Phys. Chem.*, 173(1)., 1991, pp.79–85.

Harrison et al., "Kinetically cooperative models: boundary movement in optical resolution, phase transitions, & biological morphogenesis"., *Can. J. Chem.*, (66) 839; 1988.

(List continued on next page.)

*Primary Examiner*—Robert J. Warden
*Assistant Examiner*—Theresa T. Snider
*Attorney, Agent, or Firm*—Hill & Schumacher

[57] ABSTRACT

A method of destabilizing the homogeneous steady state of a dynamical system with two or more dynamically coupled variables through the action of a differential bulk flow of the key species, termed Differential Flow Induced Instability (DIFII), is disclosed. The DIFII is also applicable to systems with time periodic (limit cycle) and aperiodic (chaotic) states. Turing predicted that in systems characterized by activator/inhibitor kinetics a homogeneous, stable steady state of the reactive system may lose its stability and form inhomogeneous patterns due to the interaction of diffusion and reaction when the diffusion coefficient of the inhibitor is sufficiently greater than that of the activator. This mechanism is believed to form the basis of biological morphogenesis. The method of the present invention avoids this constraint on the diffusivities in the dynamically coupled two component system by using a differential bulk flow between the activator and the inhibitor species rather than a differential diffusivity. In systems with three (or more) dynamically coupled components the requirement of the presence of an activator species (or subsystem) is relaxed and if there is no activator species (or subsystem) present, the system may be destabilized by a differential flow of its components, in contrast to systems of two dynamical variables. Technological advantages such as reaction yield enhancement are shown. The method disclosed herein is shown to be applicable to a wide range of systems including chemical, biological and physical.

43 Claims, 30 Drawing Sheets

OTHER PUBLICATIONS

V. Castets et al. "Experimental Evidence of a Sustained Standing Turing-type Nonequilibrium Chemical Pattern"; Physical Review Letters, vol. 64, No. 24, 1990.

Q. Ouyang et al. "Transition to Chemical Turbulence", Chaos, vol. 1, No. 4, 1991.

H. Meinhardt: "Model of Biological Pattern Formation"; 1982, Chapter 3, Academic Press.

H. G. Purwins et al.; Pattern Formation on Analogue Networks Published in Neural and Synergetic Computers International Workshop on Synergetics; Jun. 13–17, 1988; Springer 1988.

Re λ

LOG k

DYNAMICAL DESTABILIZATION OF SYSTEMS CHARACTERIZED BY KINETICALLY COUPLED COMPONENTS USING A DIFFERENTIAL FLOW

The present application is a continuation-in-part of U.S. patent application Ser. No. 07/932,560 filed on Aug. 20, 1992, now U.S. Pat. No. 5,332,677.

FIELD OF THE INVENTION

The present invention relates to a method of destabilizing the homogeneous steady state, or periodic or aperiodic states of spatially extended dynamical systems characterized by kinetically or dynamically coupled components through the action of a differential bulk flow of the key components.

BACKGROUND OF THE INVENTION

Turing predicted that a homogeneous and otherwise stable steady state of a reactive, kinetic system comprising an activator and inhibitor species may lose its stability and form inhomogeneous patterns due to the interaction of diffusion and reaction, see A. Turing, Philos. Trans. Roy. Soc. London Ser. B 237, 37 (1952). This prediction has been recently verified experimentally by Castets et al. wherein pattern formation was observed in the chlorite/iodide/malonic acid system, as disclosed in V. Castets, E. Dulos, J. Boissonade, and P. DeKepper, Phys. Rev. Lett. 64, 2953 (1990). These results support Turing's prediction that a homogeneous and otherwise stable reactive system may lose its stability (Turing instability) and form inhomogeneous patterns due to the interaction of diffusion and reaction.

This mechanism is believed to be fundamental to morphogenesis in biological systems as discussed in for example H. Meinhardt, Models of Biological Pattern Formation (Academic Press, 1982) and J. D. Murray, Mathematical Biology, (Springer Verlag, Berlin, 1989). L. Segel and J. L. Jackson, J. Theor. Biol. 37, 545 (1972). Specifically, the Turing instability can occur in an autocatalytic chemical or biochemical system comprising an activator species A which stimulates its own production and the production of its antagonist, an inhibitor I, if the diffusion coefficient of the inhibitor I is sufficiently greater than that of the activator A. When such a system is maintained in a homogeneous condition such as by stirring or other agitation means, it settles into a steady state through the balance of activation and inhibition. However, when a local concentration fluctuation arises in a non-agitated system, diffusion comes into play In addition to chemical relaxation. Diffusion acts to remove or replenish species that are locally in excess or depleted, respectively, as the case may be. When this process proceeds at different rates for the two species proportional to their diffusivities, the balance between the activator and inhibitor, that existed in the perfectly stirred system, may be broken in such a way as to permit the activator concentration to grow locally, see L. Segel and J. L. Jackson, J. Theor. Biol. 37, 545 (1972). Therefore, the primary role of diffusion in the instability is to spatially disengage the counteracting species.

The physical constraints under which the Turing instability is achieved are quite severe and can occur in an activator/inhibitor system only if the diffusion coefficient of the inhibitor is sufficiently larger than that of the activator, i.e. if $\delta \equiv D_{inh}/D_{act} > \delta_c > 1$. In other words, the Turing instability can only be observed in activator/inhibitor systems comprising different diffusivities of the activator and inhibitor species. However, in most liquid systems there is generally little difference in the diffusion coefficients for the different species as long as their molecular masses are of the same order, and the ratio $D_{inh}/D_{act}$ is beyond experimental control: hence the Turing instability Is not a common occurrence.

Accordingly, it would be advantageous to provide a general method of destabilizing the homogeneous steady state or homogeneous oscillating states of spatially extended systems having kinetically or dynamically coupled components. It would be advantageous to provide such a method which would not depend primarily on the diffusion coefficients of the key species and which have general applicability to a wide range of systems such as chemical, physical and biological systems.

SUMMARY OF THE INVENTION

The present invention provides a method of destabilizing a spatially extended dynamic system having at least two variables which are dynamically coupled. The method comprises producing a differential flow in the spatially extended dynamic system between at least one of said at least two variables and at least one of the remaining at least two variables, the differential flow being greater than a threshold flow.

In another aspect of the invention there is provided a method of increasing reaction yields in a spatially extended dynamic system comprising dynamically coupled activator and inhibitor variables. The method comprises dynamically coupled activator and inhibitor variables, the method including destabilizing the spatially extended dynamic system by inducing a differential flow between the activator and inhibitor variables. The differential flow being greater than a threshold flow.

In another aspect of the invention there is provided a method of preferentially selecting a reaction channel In a reactive system having at least two variables and at least two competing reaction channels, wherein the competing reaction channels can be dynamically destabilized to varying degrees by inducing a differential flow between the at least two variables of the reactive system. The method includes inducing a differential flow between the at least two variables of the system in such a way that one reaction channel is destabilized to a greater extent than the other reaction channels thereby increasing the yield and selectivity of the one reaction channel.

In another aspect of the invention there is provided an apparatus for measuring fluid flow in a spatially extended system. The apparatus comprises means for injecting into the spatially extended system a dynamically coupled activator/inhibitor system. There is provided means for producing a differential flow between the activation and inhibition species, The differential flow is greater than a predeterminable threshold flow to destabilize the dynamically coupled activator and inhibitor species. The apparatus includes means for detecting and characterizing said spatiotemporal structures to determine the fluid flow.

In another aspect of the invention there is provided a method of increasing reaction yields in a spatially extended dynamic system comprising at least two dynamically coupled variables, the method including destabilizing the spatially extended dynamic system by inducing a differential flow between at least one of said at least two dynamically coupled variables and at least one of the remaining variables, the differential flow being greater than a threshold flow. In this aspect of the invention the spatially extended dynamic system is selected from the group consisting of stable steady state and periodic and aperiodic biological systems, stable steady state and periodic and aperiodic chemical systems, stable steady state and periodic and aperiodic biochemical systems, stable steady state and periodic and aperiodic electrochemical systems.

BRIEF DESCRIPTION OF THE DRAWINGS

The method of destabilizing the homogeneous steady state and inducing spatio-temporal structures in physical systems characterized by kinetically coupled variables will now be described, including non-limiting representative examples of devices in which these structures may be formed, reference being had to the drawings, in which:

FIG. 3 shows the evolution of a perturbation in the circular reactor with flow of the X species wherein

17(c) shows the corresponding ratio $\omega_{DIFICI}/\omega_{homog}$ of oscillation frequencies. Note that all three quantities $X_{DIFICI}^{max}/X_{homog}^{max}$, $<X_{DIFICI}>/<X_{homog}>$ and $\omega_{DIFICI}/\omega_{homog}$ are significantly enhanced relative to the homogeneous state, through the action of the differential flow. Furthermore, $\omega_{DIFICI}$ initially increases linearly with v.

Figure 18:
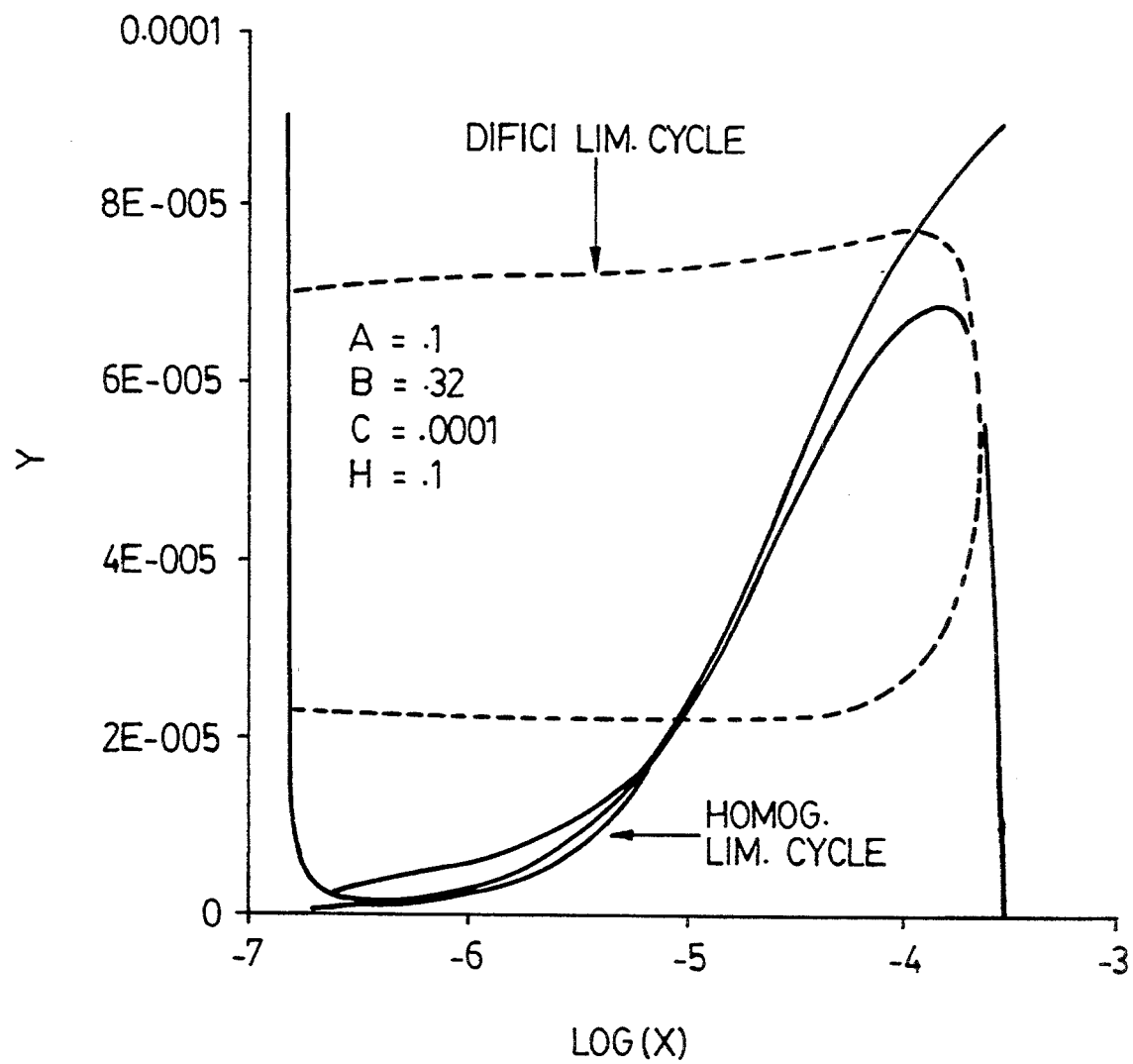

FIG. 18 illustrates the phase plane for the Pushinator model showing the homogeneous limit cycle and the greatly expanded and displaced differential-flow-induced cycle.

Figure 19A:
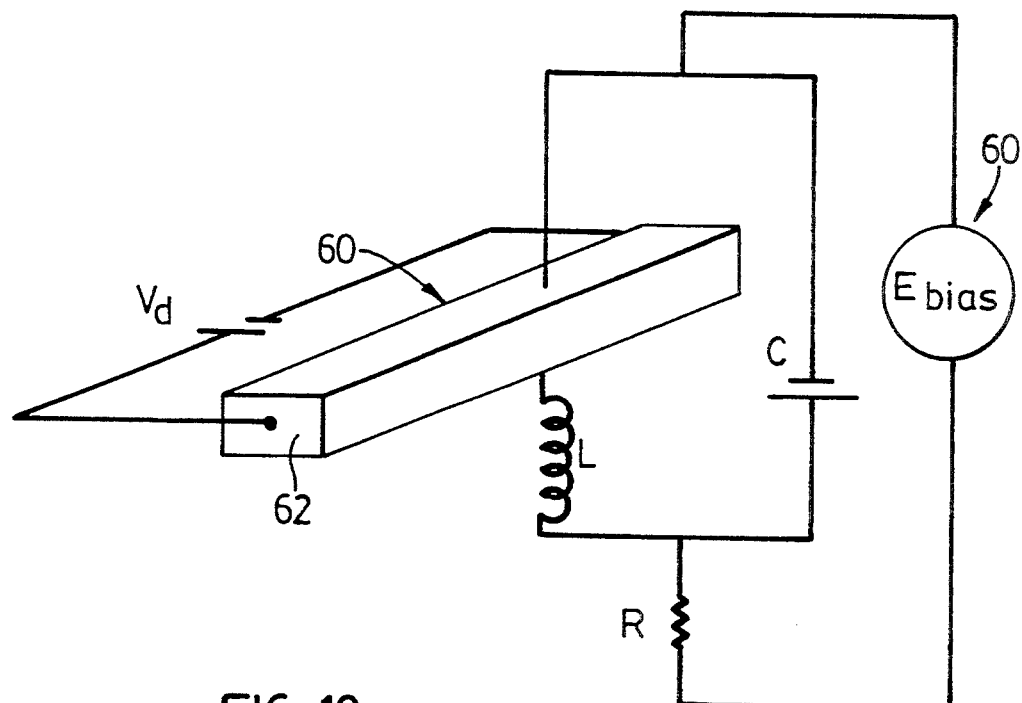

FIG. 19(a) shows a schematic representation of an electrical device comprising a semiconductor with S-shaped voltage-current characteristics including circuitry for a applying a bias along the length of the device and in the perpendicular direction to the longitudinal direction.

Figure 19B:
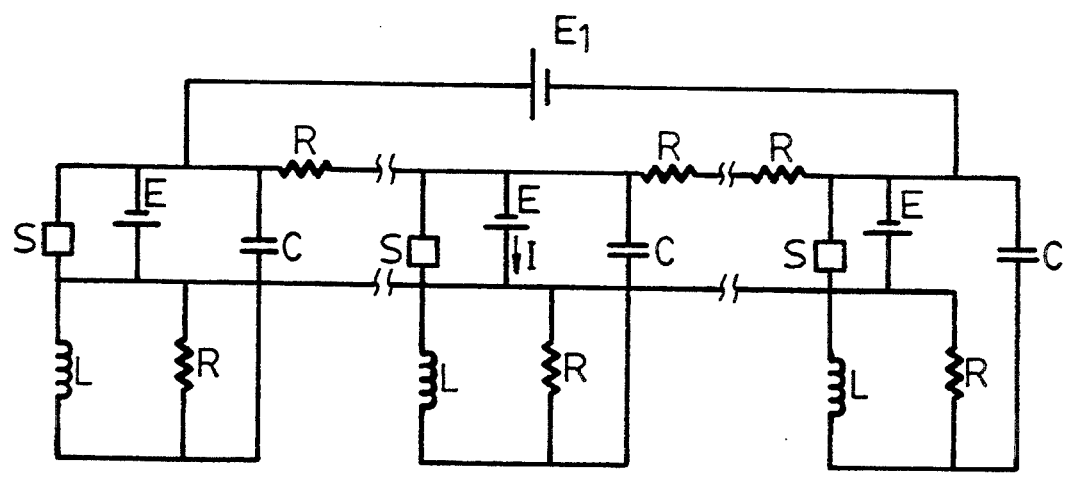

FIG. 19(b) illustrates a schematic representation of the equivalent circuit of the device shown in FIG. 19(a) wherein the two terminal circuits are shown along with a representative intermediate circuit.

Figure 20A:
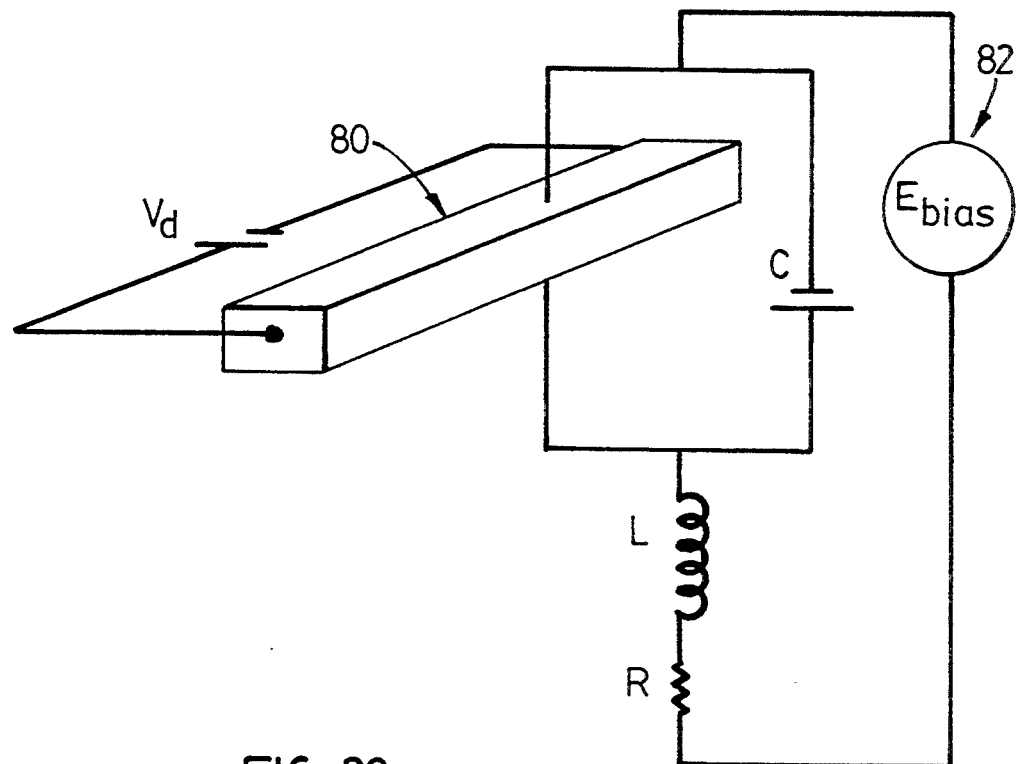

FIG. 20(a) shows a schematic representation of an electrical device comprising a semiconductor with N-shaped voltage-current characteristics including circuitry for a applying a bias along the length of the device and in the perpendicular direction to the longitudinal direction.

Figure 20B:
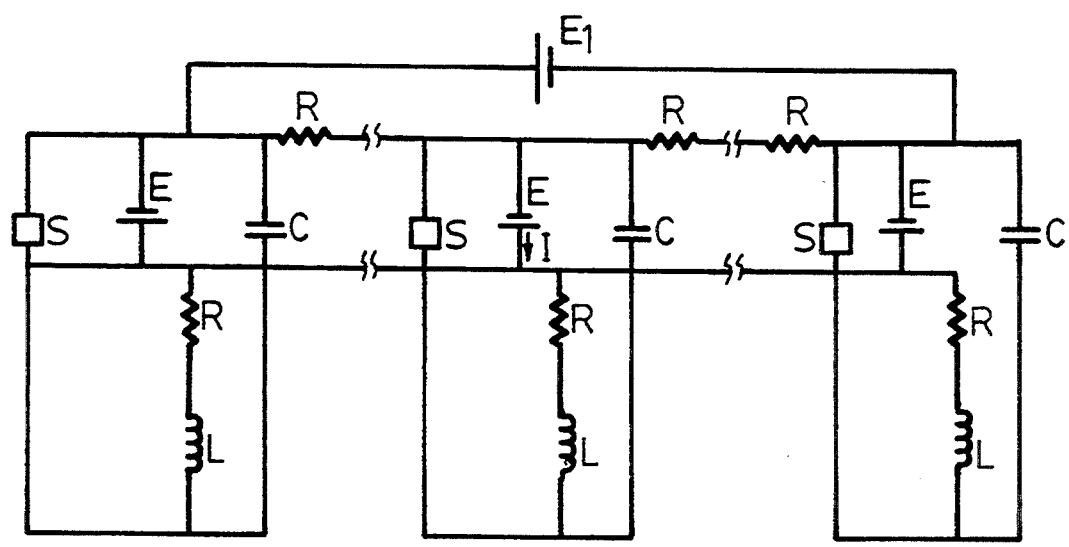

FIG. 20(b) illustrates a schematic representation of the equivalent circuit of the device shown in FIG. 19(a) wherein the two terminal circuits are shown along with a representative intermediate circuit.

Figure 21:
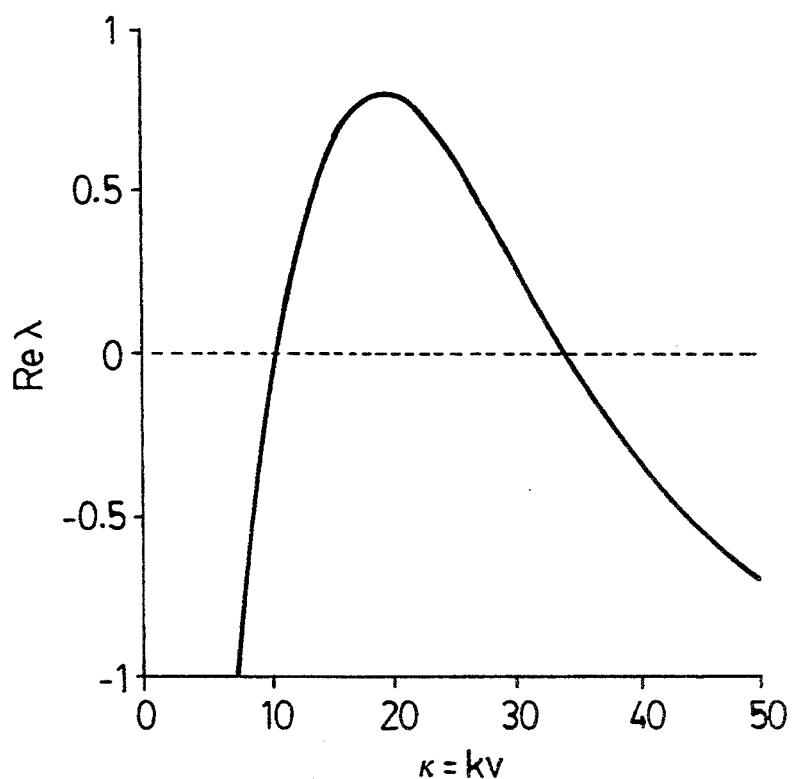

FIG. 21 shows the real part of one of the eigenvalues for the Petrov-Scott-Showalter model, see V. Petrov, S. K. Scott and K. Showalter, J. Chem. Phys. 97, 6191 (1992) of a chemical system without activator as a function of wavenumber, The other two eigenvalues always remain in the left hand plane.

Figure 22:
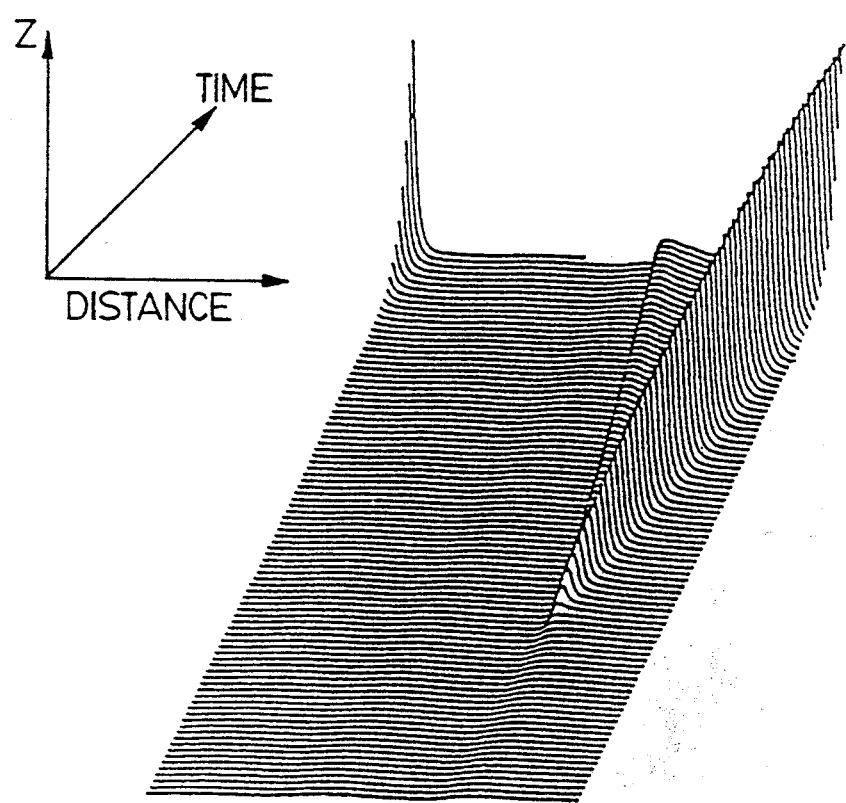

FIG. 22 relates to the more general three species system and illustrates the early stage of the flow induced instability for Petrov-Scott-Showalter model of a chemical system without activator calculated on a ring (periodic boundary conditions) with diffusive terms added (all three diffusion coefficients equal). The z variable of the model is plotted.

DETAILED DESCRIPTION OF THE INVENTION

Definitions:

In this patent application use is made of the terms: "species", "key species", "components", "variables" and "subsystems". "Species", "components" and "key species" refer to identifiable physical entities that constitute the dynamical system. For example, two component systems can be destabilized using the method of the present invention only if the system is governed by activator/inhibitor kinetics so that the key species would be activator species and inhibitor species which could be respectively molecular entities, If a large system can be reduced, mathematically, to a system of less variables, the latter are called "key variables" or "key species" (e.g. activation/inhibitor).

The term "variables" is mathematical and more general than "species". It may stand for a quantitative measure of a physical entity or it may be expressed through these measures in a more complicated way. For instance, as will be discussed below, in a two variable system comprising the exothermic A→B+heat reaction, the heat released is a key variable (activator) which could not be called a (molecular) species. "Subsystem" is an abstract term, explained near equation (29,30) that refers to a dynamical system consisting of one or few "variables" that form part of a larger dynamical system.

The terms "kinetically coupled" and "dynamically coupled" are used interchangeably in this application and when variables (species) are said to be kinetically coupled, this means that the evolution of one variable (species) depends on the presence of the other variable(s) (specie(s)). More specifically, it will be understood that species A and B are directly (dynamically) coupled if the temporal evolution of at least one of the species depends on the magnitude of the other. Species A and B are indirectly (dynamically) coupled if there are other species $C_1, C_2, \ldots, C_n$, such that in the sequence $A, C_1, C_2, \ldots C_n, B$ every subsequent species is directly coupled with the previous one. Species A and B will be referred to as being dynamically coupled if they are coupled either directly or indirectly. A system of N species is (dynamically) coupled if every pair of the constituent species is coupled.

1. TWO VARIABLE SYSTEMS

A) Background

This part of the description relates to two variable systems containing activation means and inhibition means and characterized by inhibition/activation kinetics. The basis of this part of the present invention is the idea that the inhibition and activation means may be disengaged by their differential flow. Technological advantages will be disclosed that arise from the operation of a kinetic activator/inhibitor system under conditions of differential flow such that the homogeneous state is destabilized. It will be disclosed herein that the homogeneous state may be destabilized by flows of activation means and inhibition means at different flow rates, regardless of which one is faster. This makes the present mechanism free of the rather severe restrictions of the Turing instability on the diffusion coefficients and thus much more general. We refer to the mechanism generally as the Differential Flow Induced Instability (DIFII) and in chemical systems more specifically as the Differential Flow Induced Chemical instability (DIFICI).

Consider a situation where one of the species, Y, is immobilized on a solid support such as disclosed in J. Maselko, and K. Showalter, Nature 339, 609 (1989), while the X species flows through the one-dimensional reactor with velocity v. This system is described by the reaction-flow-diffusion equations $$\dot{X} = f(X,Y) + v\frac{\partial X}{\partial r} + D\frac{\partial^2 X}{\partial^2 r} \quad (1)$$

$$\dot{Y} = g(X,Y)$$

where the spatial coordinate axis is chosen to lie in the direction of the flow. We assume that the chemical reaction has a stable steady state $X_0, Y_0$ (i.e. $f(X_0,Y_0) = g(X_0,Y_0) = 0$) when run in a perfectly stirred vessel.

Linearizing the system near the steady state while ignoring the diffusion term results in:

$$\dot{x} = a_{11}x + a_{12}y + v\frac{\partial x}{\partial r} \quad (2)$$

-continued
$$\dot{y} = a_{21}x + a_{22}y$$

where $X=X_0+x$, $Y=Y_0+y$, and stability requires that $a_{11}+a_{22}<0$ and $\Delta=a_{11}a_{22}-a_{21}a_{21}>0$. With reference to equation 2, we call species X an activator if $a_{11}>0$ and we call species Y an activator if $a_{22}>0$. Conversely, X is called an inhibitor if $a_{11}<0$ and Y is called an inhibitor if $a_{22}<0$.

Assume now that the system is either spatially infinite or periodic (a ring), Then we can use the spatial Fourier expansion $x(r,t) = \int x_k(t) e^{ikr} dk$ and obtain the equations for the Fourier-components $$\dot{x}_k = (a_{11}+ikv)x_k + a_{12}y_k$$

$$\dot{y}_k = a_{21}x_k + a_{22}y_k \qquad (3)$$

The eigenvalues of system (3) are $$\lambda_{1,2} = \tfrac{1}{2}[a_{11} + a_{22} + ikv \pm \sqrt{(a_{11}+a_{22})^2 - 4\Delta - k^2v^2 + 2ikv(a_{11}-a_{22})}\,] \qquad (4)$$

The real part R of the square root in eq. (4) is $$R = \frac{1}{\sqrt{2}}\sqrt{\sqrt{(Q-k^2v^2)^2 + 4k^2v^2(a_{11}-a_{22})^2} + Q - k^2v^2} \qquad (5)$$

where $Q=(a_{11}+a_{22})^2-4\Delta$.

It can be shown that the sign of $dR/d(k^2)$ is either always positive (if $a_{12}a_{21}<0$) or negative (if $a_{12}a_{21}>0$) and consequently that R is a monotonic function of k. Then, depending on the sign of $dR/d(k^2)$, $Re\lambda_1(k)$ rises/falls monotonically from $Re\lambda_1(0)$ to $Re\lambda_1(\infty)$ and $Re\lambda_2(k)$ falls/rises from $Re\lambda_2(0)$ to $Re\lambda_2(\infty)$. It follows that $Re\lambda_1(\infty)=a_{11}$ and $Re\lambda_2(\infty)=a_{22}$ if $a_{11}>a_{22}$ and that $Re\lambda_1(\infty)=a_{22}$ and $Re\lambda_2(\infty)=a_{11}$ if $a_{11}<a_{22}$.

Let us assume that $a_{11}>a_{22}$. Furthermore, if $a_{11}<0$ and still subject to $a_{11}+a_{22}<0$, then it is clear that $Re\lambda_1$ becomes positive at sufficiently large k. A positive value of $Re\lambda_1$ implies instability of the homogeneous steady state $(X_0,Y_0)$. Hence the system becomes unstable against short wavelength perturbations. The critical wave number $k_c$ (i.e. such that $Re\lambda_1(k_c)=O$) is $$k_c = -\frac{a_{11}+a_{22}}{v}\sqrt{-\frac{\Delta}{a_{11}a_{22}}} \qquad (6)$$

Figure 1A:
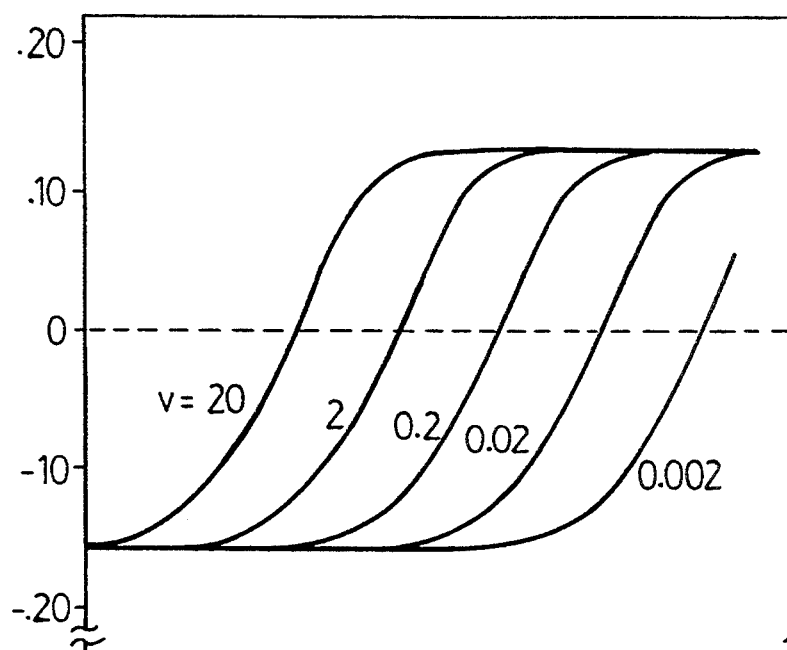
FIG. 1 a) shows the real part of the eigenvalue of the linear stability matrix as a function of the wavenumber for different flow velocities $v$ (cm/sec) (without diffusion); b) the same as (a) but with diffusion of species X (defined in the description) being taken into consideration with species X having a diffusion coefficient given by $D_x = 2 \times 10^{-5}$; and c) the real part of the eigenvalue for different ratios $\delta = D_{inh}/D_{act}$ of the diffusion coefficients and zero flow velocity. Parameters of the model, referred to as the Puschinator model, are: $A = 0.125$, $B = 0.2$, $C = 0.0003$, $h_0 = 0.03$.

Since $\lambda$ is always complex for $k>0$ the instability is of the travelling wave type. When diffusion is included, the dispersion relation is $$Re\lambda_1 = \qquad (7)$$

$$\tfrac{1}{2}\left[a_{11} + a_{22} - (D_1+D_2)k^2 + \frac{1}{\sqrt{2}}\sqrt{\sqrt{q^2+p^2}+q}\,\right]$$

where
$p = 2kv[a_{11}-a_{22}-(D_1-D_2)k^2]$, and
$q = [a_{11}-a_{22}-(D_1-D_2)k^2]^2 + a_{12}a_{21} - k^2v^2$ To illustrate this DIFICI case of spatial instability on hand of an experimentally verifiable system, we consider here the Puschinator model (A. B. Rovinsky, A. M. Zhabotinsky, J. Phys. Chem. 88, 6081 (1984)) of the Belousov-Zhabotinsky (BZ) reaction $$\frac{dx}{d\tau} = \frac{1}{\epsilon}\left[x(1-x) - \left(2q\alpha\frac{y}{1-y} + \beta\right)\frac{x-\mu}{x+\mu}\right] \qquad (8)$$

$$\frac{dy}{d\tau} = x - \alpha\frac{y}{1-y}$$

where: $[Fe(phen)^{3+}] \equiv Y = Cy$, $[HBrO_2] \equiv X = k_1Ax/2k_4$, $\epsilon = k_1A/k_4C$, $\alpha = k_4k_8B/(k_1A)^2h_o$, $\mu = 2k_4k_7/k_1k_6$, $t = \tau k_4C/(k_1A)^2h_o$, $\beta = 2k_4k_{13}B/(k_1A)^2h_o$, $C = [Fe(phen)^{2+}] + [Fe(phen)^{3+}]$, $A = [NaBrO_3]$, $B = [CHBr(COOH)_2]$, $h_o$ is the acidity function, q is the stoichiometric factor, and $k_i$ are the rate constants, see A. B. Rovinsky, A. M. Zhabotinsky, J. Phys. Chem. 88, 6081 (1984), and R. R. Aliev, and A. B. Rovinsky, J. Phys. Chem. 96, 732 (1992). (Here we use Y/y for $[Fe(phen)^{3+}]$ instead of the traditional notations Z/z). Dispersion curves $Re\lambda_1(k)$ were calculated in the absence of diffusion as functions of k for different values of the flow rate v, as shown in FIG. 1(a). As one can see, for any velocity v there is a critical wavenumber given by equation 6 above which the homogeneous state becomes unstable.

Figure 1B:
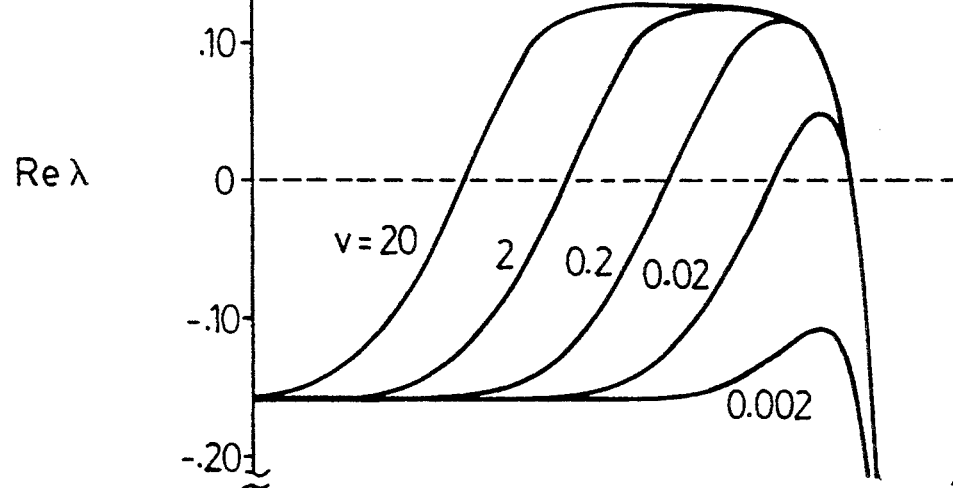
Figure 2:
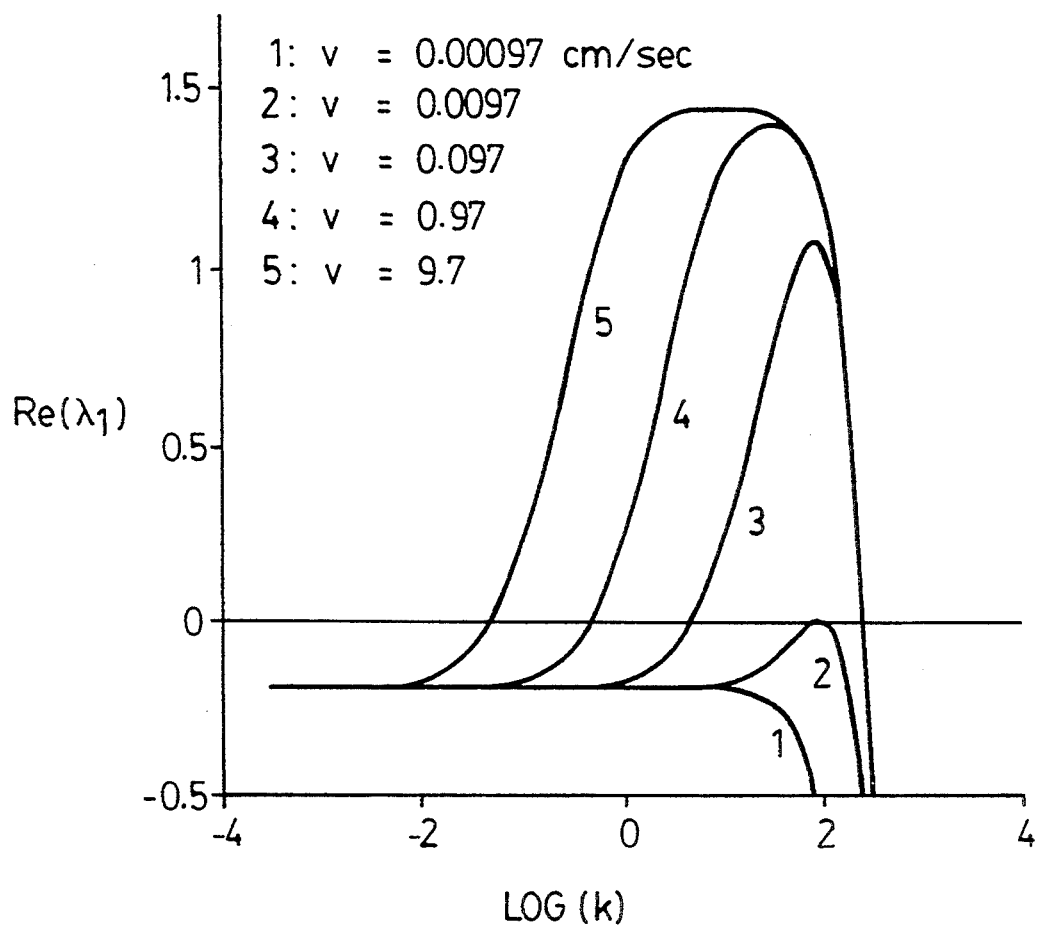
FIG. 2 shows the real part of the eigenvalue as a function of the wavenumber for the DIFICI In the Puschinator model, at different differential flow velocities v, The parameters are: $A = 0.8$, $B = 0.4$, $C = 0.0003$, $h_0 = 0.02$.

In real systems, whether the general non-chemical DIFII applies or in chemical systems in which DIFICI applies, diffusion must be considered in addition to flow. Introducing autocatalyst diffusion (the inhibitor is immobilized) through the diffusion term in equation (1) produces the short wavelength cut-off in the dispersion curves, as shown in FIG. 1(b). This entails the appearance of a threshold flow velocity $v_{min}$, below which the homogeneous steady state is always stable. This critical flow velocity corresponds to curve 2 in the dispersion relation plotted in FIG. 2. This critical velocity as well as the critical wave number $k_c$ are implicitly given by the conditions: $Re\lambda_1(k_c)=O$ and $d(Re\lambda_1(k_c))/d(k^2)=0$. The accurate explicit expressions for $k_c$ and $v_{min}$ are rather cumbersome in this case but a rough estimate gives: $k_c \sim \sqrt{|a_{11}+a_{22}|/D}$. The critical flow velocity $v_{min}$ is approximately given by $$v_{min} = \sqrt{(a_{11}+a_{22})\Delta D/a_{11}a_{22}} \qquad (9)$$

Figure 1C:
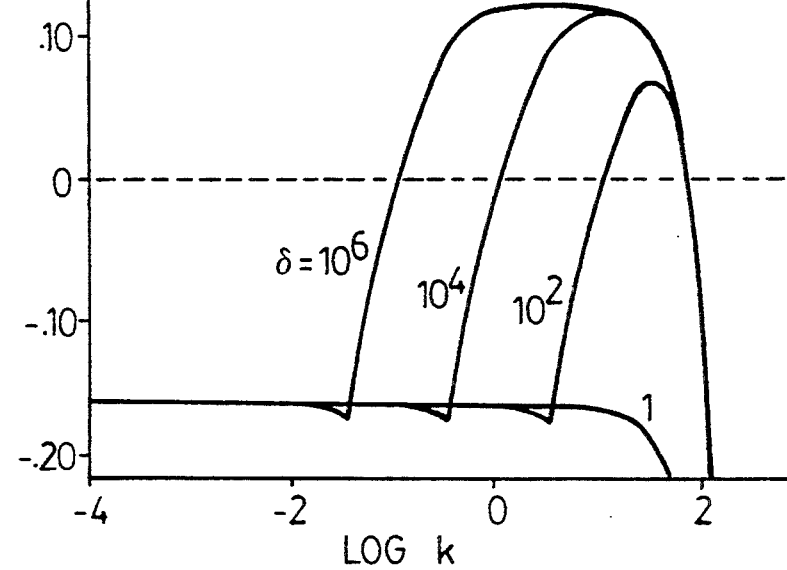

It is also worth noting that the dispersion curves at constant diffusion ratio $\delta=D_{inh}/D_{act}$, parametrized by v resemble closely those of the Turing case parametrized by $\delta$ in the absence of the flow as illustrated in FIG. 1(c).

Figure 3A:
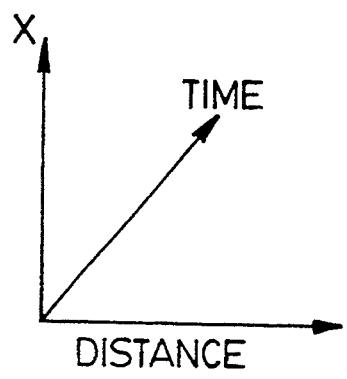
FIG. 3(a) shows the initial growth stage of the instability and FIG. 3(b) showing that the instability has developed into a pulse train travelling around the medium; $A = 0.15$, $v = 0.2$, all the other parameters are as in FIG. 1. The vertical scale in FIG. 3(b) is 10 times as large as in FIG. 3(a).
Figure 3A:
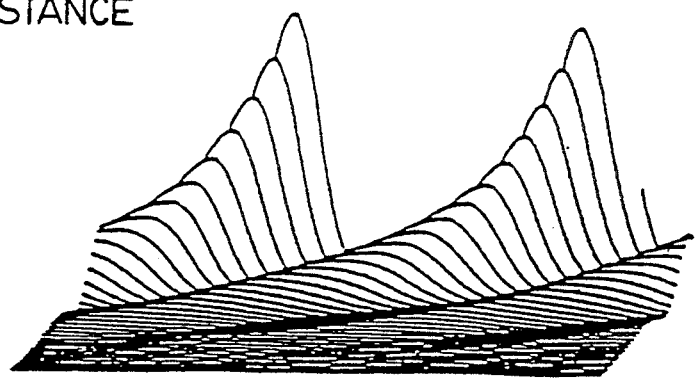
Figure 3B:
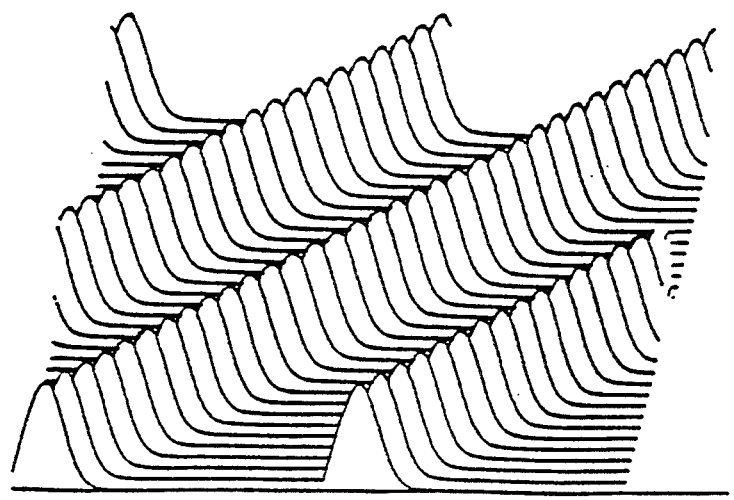

To study the dynamical consequences of the DIFICI we have numerically integrated the reaction-diffusion-flow equations for the Puschinator model in a similar manner to that described in R. R. Aliev, and A. B. Rovinsky, J. Phys. Chem. 96, 732 (1992), but now including flow terms. Two configurations of the 1-D reactor were studied. One was circular, with periodic boundary conditions. The other corresponded to a semi-infinite tube, fixed in the frame of immobilized ferroin species, that was fed with an input flow containing neither ferroin nor the autocatalyst Hbro$_2$ (Dirichlet's boundary condition). In the circular reactor, the perturbation of the homogeneous state was imposed as a cosine function of the spatial coordinate with an amplitude equal to 1 percent of the steady state value. In the tubular reactor, the boundary condition itself acted as the perturbation. In both configurations the perturbations evolved Into pulses that travelled along the tube like ordinary pulses in excitable media as long as the flow velocity exceeded the minimum value. Otherwise they decayed to the stationary homogeneous state in the opposite case. The evolution and initial growth stage of the instability is shown in FIG. 3($a$) and the asymptotic form of a typical pulse train travelling around the circular reactor are shown in FIG. 3($b$).

The difference between the waves simulated here and ordinary trigger waves lies in their origin. The generation of trigger waves is always associated with a local pacemaker and local inhomogeneity, see A. T. Winfree, "When Time Breaks Down" (Princeton University Press, 1987) and "Oscillations and Travelling Waves in Chemical Systems", R. J. Field, and M. Burger, Eds., (Wiley-Interscience, 1985) that imposes a finite perturbation (either single, periodic or multiple aperiodic) on the system and thus locally drives it above the excitation threshold. The pacemaker emits waves with radial symmetry. If the perturbation is smaller than the threshold, trigger waves do not appear and the system remains stable and homogeneous. In the present case, due to the Instability, the waves develop all over the system from infinitesimally small perturbations and are asymmetric, that is they propagate only in the direction of the flow.

The present Instability has also much in common with the Turing instability. The obvious analogy is that the necessary condition for both instabilities is the same: $a_{11}$ or $a_{22}$ must be positive, implying the presence of an autocatalytic species. If a diagonal element, either $a_{11}$ or $a_{22}$, is positive then the corresponding species grows exponentially provided that the concentration of the other species is fixed. This similarity is illustrated by the dispersion relation illustrated by FIGS. 1($b$) or 1($c$) where the latter represents the Turing case. The same decay rates at k=O and the maximal growth rates of perturbations (=$a_{11}$) for both Turing and differential flow cases illustrate the fact that the ultimate cause of the instabilities in both cases is the local autocatalytic kinetics of one of the species while the differential transport, be it achieved by diffusion or by bulk flow, serves merely to disengage the autocatalyst from the inhibitor response.

While the occurrence of the Turing instability depends crucially on the ratio of diffusion coefficients $\delta$ (with $\delta > \delta_c > 1$, where $\delta_c$ is the critical value of $\delta$, a condition that is usually beyond experimental control although theoretically $\delta$ is often treated as the control parameter), the flow induced instability is determined merely by the magnitude $|v|$ of the relative flow velocity (or rather by the ratio $|v|/\sqrt{D}$ when diffusion is included). Thus it is immaterial which of the two key species is immobilized: fixing the inhibitor in a manner similar to that disclosed in J. Maselko, and K. Showalter, Nature 339, 609 (1989) promotes the DIFICI while this would prevent the Turing instability from occurring. Furthermore, the flow rate is easily controlled over a wide range. Therefore, we foresee that this instability occurs in a broad class of experimental systems.

Up to now the analysis applies to systems of infinite or sufficiently large size L. Given the intrinsic wavelength of the patterns, it is clear that there is a critical size $L_c(v)$ below which patterns cannot develop. Both $L_c(v)$ and $v_{min}$ must be considered for real systems.

In summary, it has been shown that in the DIFICI the key species may be uncoupled more generally than in the Turing instability by their differential flow. Specifically, it has been shown that the homogeneous steady state may be destabilized by flows of activator and inhibitor at different flow rates, regardless of which one is faster. This makes the mechanism free of the Turing restrictions on the diffusion coefficients and thus much more general.

We report here the first experimental verification of DIFICI and the resulting wave patterns in the ferroin-catalyzed BZ system in a quasi-one dimensional flow tube.

Figure 4:
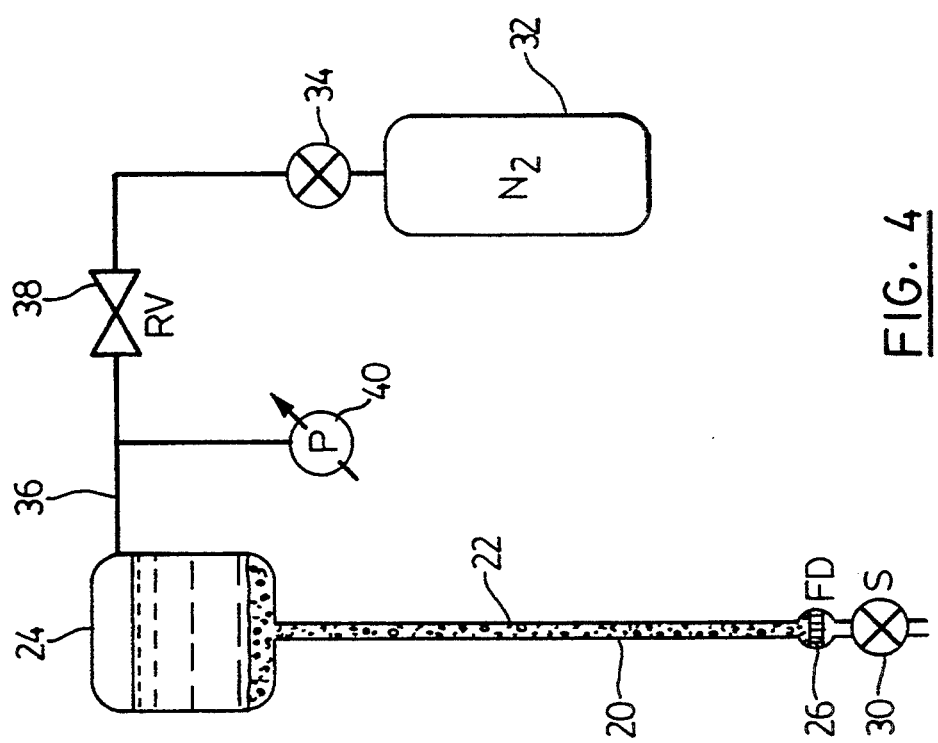
FIG. 4 illustrates one embodiment of an apparatus used for inducing and observing the dynamical instability in a flow system generated by the method of the present invention.

Referring to FIG. 4, the ferroin Ion is immobilized on a cation-exchange resin shown at 20 located in a tube 22 and all other reactants flow through tube 22 as In a chromatographic column. The cation exchange resin 20 is one of many possible open support structures which may be used for immobilizing or partially immobilizing either the activation or inhibition means. The internal diameter of the glass tube 22 is 3.2 mm, the length of the tube is approximately 25 cm and a reservoir 24 is attached to the top of tube 22. The diameter of the reservoir is 25 mm. A fritted disk 26 is located at the bottom of the tube 22. Tube 22 is provided with a stopcock 30 to arrest the fluid flow through the tube. Dowex 50X4-400 ion exchange resin, and Aldrich chemicals were used. A 2M stock solution of bromomalonic acid (BMA) was prepared at 0° C. according to A. N. Zaikin, and A. M. Zhabotinshky, Nature 225, 535 (1970). The volume of the bead suspension settled in distilled water was the reference value for the loading with ferroin instead of the weight of beads, see J. Maselko, and K. Showalter, Nature 339, 609 (1989).

A typical loading of $10^{-4}$ moles/liter was used and the loaded beads were then mixed with the solution of the other reactants and the larger part of the mixture was transferred to the tube 22 of FIG. 4. The rest was poured into a Petri dish (depth: 1 mm beads, 10 mm liquid) for use as a reference experiment. The beads filled the tube and part of the reservoir as shown in FIG. 4. This part was also used for the reference experiment. The fritted glass disk 26 prevented washout of the beads. The flow rate was controlled by applying compressed nitrogen gas supplied from a nitrogen gas tank 32 having an on/off valve 34. The flow was assumed to be proportional to pressure. The gas is fed to the upper portion of the reservoir 24 via a gas line 36. The line pressure is controlled by a pressure regulating valve 38. A pressure sensor 40 attached to line 36 provided a means of monitoring the gas pressure. Experiments were discarded when the reference experiments showed oscillatory or pacemaker activity. The sets of parameters commonly used were: $[H_2SO_4]=0.02M$, $[Fe(phen)^{2+}_3]+[Fe(phen)^{3+}_3]=10^{-4}M$ and a) $[NaBrO_3]=0.8M$, $[BMA]=0.4M$, and b) $[NaBrO_3]=1.5M$, $[BMA]=0.5M$. Using malonic acid instead of BMA resulted in a poorer colour contrast and reproducibility. Typically, one experiment lasted 0.5–2 hours.

Figure 5:
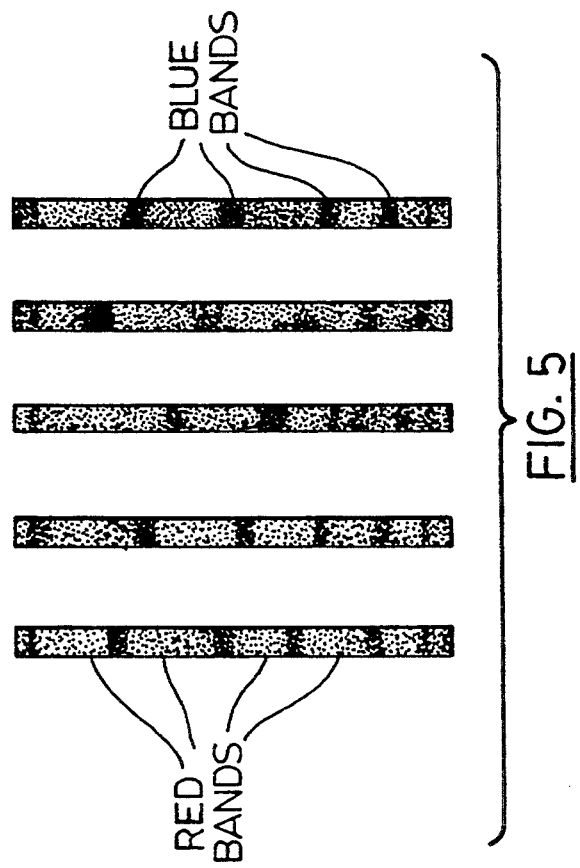
FIG. 5 shows the propagation of the waves generated by a differential flow using the apparatus of FIG. 4 with the parameters: $[H_2SO_4] = 0.02M$, $[Fe(phen)^{2+}_3] + [Fe(phen)^{3+}_3] = 10^{-4}M$ and a) $[NaBrO_3] = 0.8M$, $[BMA] = 0.4M$.
Figure 6B:
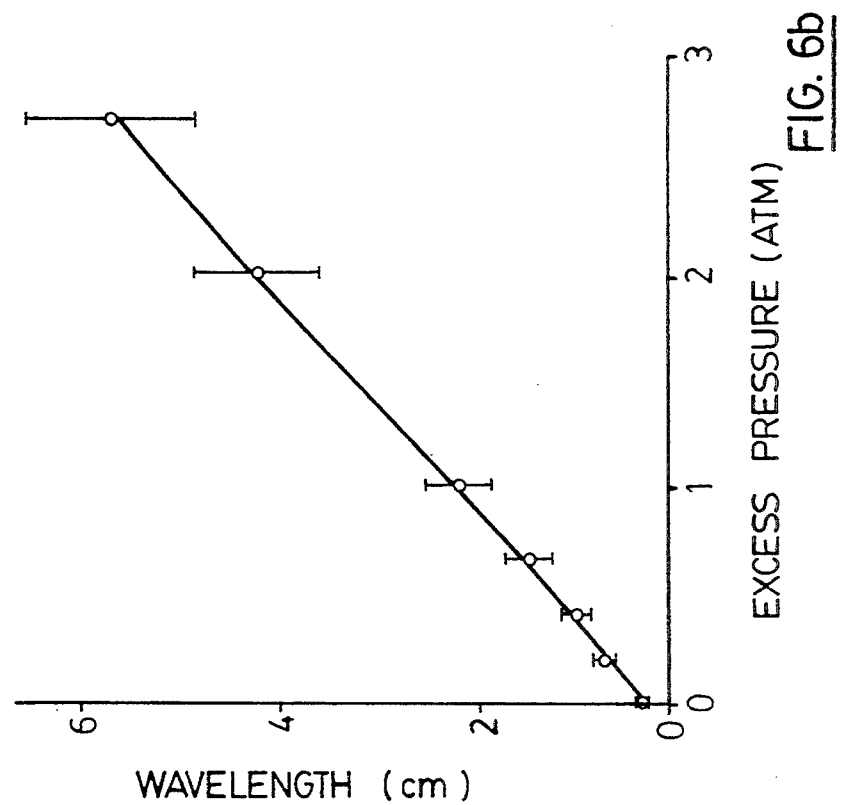
FIG. 6 is a) the velocity and b) length of the waves generated by DIFICI in the experiment using the apparatus of FIG. 4; the concentrations are as in FIG. 5.
FIG. 6(c) shows the velocity and FIG. 6(d) the length of the waves simulated by the numerical integration of the Puschinator model. The parameters are as in FIG. 5 except for $[Fe(phen)_3] = 3 \times 10^{-4}M$ (to account for packing density).
Figure 6A:
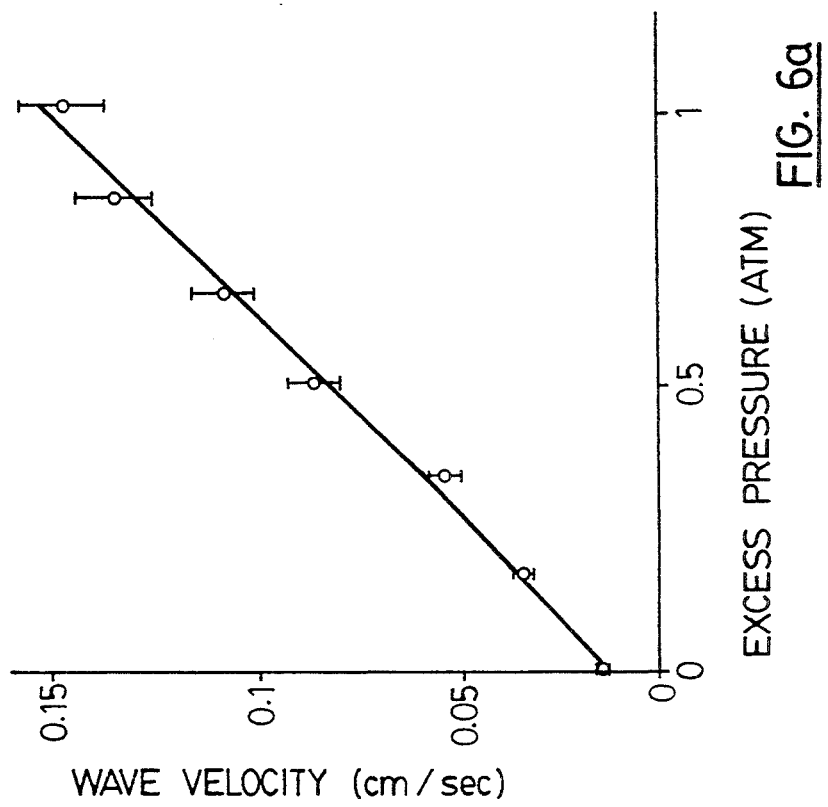

When pressure was applied to the top of reservoir 24, pale blue waves were observed that propagated down tube 22 (see FIG. 4). As discussed previously, ferroin is immobilized on the ion-exchange resin that is packed in tube 22 while the flow of the other reactants is downwards. The time interval between two successive frames is 20 sec. The waves were recorded on videotape, and the images were then processed on a computer to enhance contrast and assign colours. A diagrammatic representation of the travelling waves is shown in FIG. 5. The length and velocity of the waves were measured as functions of applied pressure. Both functions are linear (see FIGS. 6a and 6b). The non-zero wavelength and velocity at zero excess pressure reflect a residual flow due to gravity filtration. A peculiarity of the BZ system is the evolution of gas. This leads to a slow build-up of internal pressure, normally small In comparison with the external pressure. However it produced an interesting effect when the downstream stopcock 30 was closed and the external pressure was released. In this case the internal pressure started to push the solution in the upper part of tube 22 upwards. Therefore one could see initially fading of the waves, followed by the reappearance of waves that slowly moved upwards. By applying a small external pressure this back-flow could be balanced thereby causing the waves to disappear again. Due to the dead volume between fritted disc 26 and the stopcock, a small flow persisted even with the stopcock shut, when more pressure was applied. This additional pressure caused the waves to reappear and propagate downwards. When such a balance was achieved we could create and extinguish the waves and reverse their direction many times. The characteristic length of these slow waves was about 1 mm and they appeared and disappeared almost synchronously on a time scale of ca. 0.5 min on a 10 cm segment.

Figure 6D:
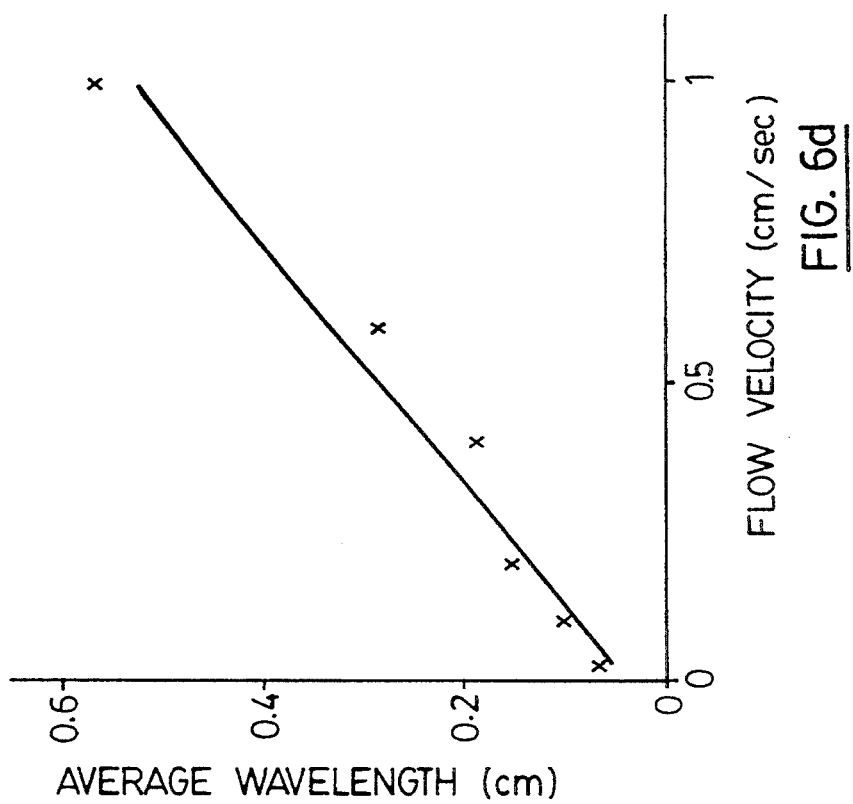
Figure 6C:
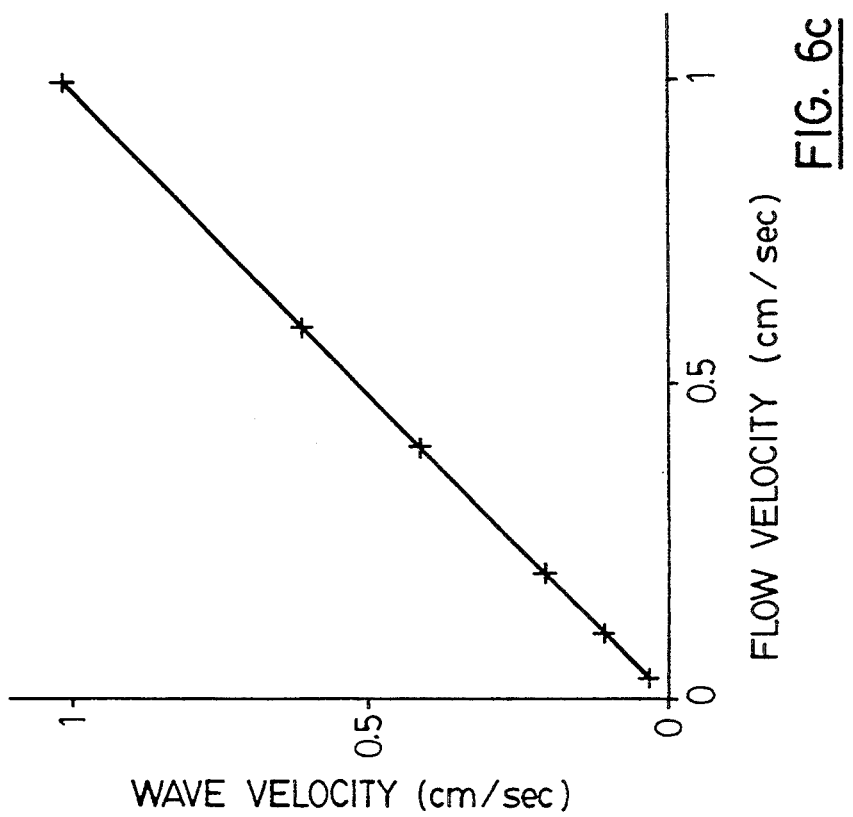

Consideration of the linearity of FIG. 6(c) shows that the method and device of FIG. 4 may be used as the basis of a fluid flow meter.

To provide a qualitative comparison between the above disclosed theoretical predictions and the experimentally measured properties, the calculated velocity and wavelength based on the Puschinator model are plotted in the FIGS. 6c and 6d. The flow velocity through the packed tube was not measured. Therefore, the experimental (FIGS. 6a, 6b) and calculated (FIGS. 6c, 6d) graphs cannot be directly superimposed. Nevertheless, their qualitative and semi-quantitative agreement is good.

Like in Turing structures, the wavelength is an intrinsic property of the system and is not determined by an external pacemaker as in trigger waves. Another difference is that the waves Induced by DIFICI develop simultaneously over the entire reactor and they are asymmetric, propagating only in the direction of the flow. Trigger waves, on the other hand, are excited locally and emitted with radial symmetry, see A. T. Winfree, "When Time Breaks Down" (Princeton University Press, 1987) and "Oscillations and Travelling Waves in Chemical Systems", R. J. Field, and M. Burger, Eds., (Wiley-Interscience, 1985). For the DIFICI, the supporting theoretical study disclosed herein predicts a lower limit of the flow rate but no upper limit. Although we could not measure this lower limit, the above observations are clear evidence for its existence. There was no evidence for the existence of an upper limit.

While the occurrence of the Turing instability depends crucially on the ratio of diffusion coefficients $\delta = D_{inh}/D_{act}$, the differential flow induced instability DIFICI is determined merely by the magnitude $|v|$ of the easily controllable relative flow velocity (or by the ratio $|v|/\sqrt{D}$ when diffusion is included). Thus it is immaterial which of the two control species is immobilized. As the illustrative example disclosed herein shows, fixing the inhibitor promotes the DIFICI, while this would prevent the Turing instability from occurring. Thus, it is the interaction between the relative diffusion of the control species and the reactivity of the control species which give rise to spatially fixed Turing patterns while in the method of the present invention it Is the interaction of the relative flow between the control species and the reactivity of the control species which give rise to the predicted and observed spatio-temporal structures disclosed herein.

The formalism developed in equations (1) to (7), based on the assumption that the reactive system has a stable steady state, predicts that under certain conditions the system can be induced to evolve spatially periodic structures arising from the spatial disengagement of the control species and that this periodic pattern is of the travelling wave type. These structures are induced and certain properties of the structures are controlled by causing a differential flow between the control species which forms the method of the present invention. The method has been Illustrated by the non-limiting example of the BZ reaction using the Puschinator model to give the reaction equations (8) i.e. f(X,Y) and g(X,Y). In this particular system the ferroin catalyst is the inhibitor and the autocatalyst $Hbro_2$ is the activator. Therefore, while the differential flow induced chemical instability method of forming periodic spatio-temporal structures has been described and illustrated with specific reference to a liquid, reactive system, characterized by activator/inhibitor kinetics, those skilled in the art will readily appreciate that the differential flow-induced instability disclosed herein may be applied to a broad range of chemical, physical, biological and sociobiological systems in which relative motion of activator and inhibitor species of the systems exist or can be induced.

For example, non-limiting examples of such systems comprise the solid state Including semiconductors and superconductors as well as low-temperature plasmas, electrolyte solutions in external fields, heterogeneous catalytic systems, and systems in developmental biology, physiology, immunology, microbiology, epidemiology and population biology to mention just a few. Other systems to which the method disclosed herein is applicable and which fall within the ambit of the present invention will be apparent to those skilled in the art.

The means for inducing differential flow between the activation means and the inhibition means will depend on the particular system under consideration. For example, in systems utilizing fluid flow, separation may be achieved in several ways depending on the nature of the activation and inhibition means. Specifically, where the activation and inhibition means are discrete activator and inhibitor species of a molecular nature, one of the species may be partially or fully immobilized in an open support structure such as an inert packing material or ion exchange medium while the other species can be flowed through the open support structure in the fluid past the immobilized species. As discussed previously, either activator or inhibitor species may be immobilized.

B) Applications i) Non-Isothermal Reactions

In chemical and physical systems, heat generated in a process can play the role of activator. The heat released in an exothermic reaction may be used to increase the reaction rate, which in turn generates more heat. Thus, the instability described earlier may also be induced for the purposes of control, production, or measurement In this type of system by suitable differential flows.

It is well known that exothermic reactions of arbitrary kinetic simplicity, including, as a textbook example, the first order reaction $$A \rightarrow B + \text{heat} \qquad (10)$$

exhibit multistability and limit cycle oscillations due to the positive feedback effect of the heat generated on the rate constant (thermal autocatalysis). This reaction is representative for all exothermic reactions since their thermal instabilities are dominated by the exponential temperature feedback, rather than by their chemical mechanism.

Figure 7:
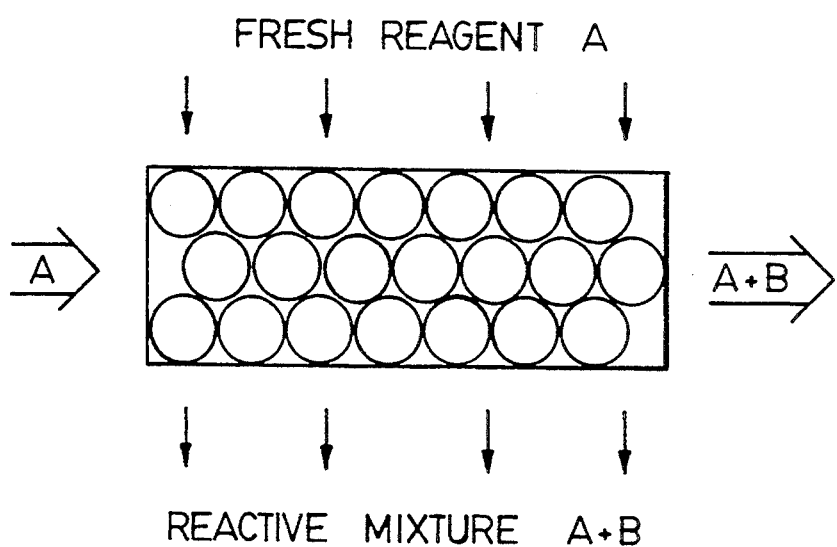
FIG. 7 is a diagrammatic representation of a tubular cross-flow reactor filled with (inert) packing.

The requirements for realizing DIFICI induced structures are (1) that the spatially distributed system be kept uniformly and sufficiently away from equilibrium, (2) that a differential flow be generated between the released heat (activator) and matter (inhibitor) flow, and (3) that the integrity of developing spatial structures be preserved by avoiding intense mixing. These conditions are met in the tubular flow reactor, schematically shown in FIG. 7, which is continuously fed by a spatially distributed cross flow. Although FIG. 7 also includes a distributed cross-outflow, achievable, e.g. by a semipermeable membrane, the latter aspect not being essential. The differential flow is achieved using with the assistance of a porous, rigid column packing. Its function is to absorb part of the released heat, proportional to its heat capacity, and thus to effectively decelerate the axial heat flow relative to that of the flow of matter.

In such a reactor, the dynamics of (10) is described by the following system of equations for c, the concentration of the reagent A, and T, the temperature of the compound liquid-solid medium:

$$\epsilon \partial_t c = (D_c \partial^2_z - v \partial_z)c - \tilde{A}c e^{-E/RT} - v_f(c - c_0)$$

$$[\epsilon \rho_f C_f + (1-\epsilon)\rho_s C_s]\partial_t T = (D_T \partial^2_z - \rho_f C_f v \partial_z)T + Q\tilde{A}c e^{-E/RT} - \rho_f C_f v_f(T - T_0) - \chi_N(S/V) \qquad (11)$$

Here $\epsilon$ is the void fraction of catalyst packing, $D_c$ the effective turbulent diffusivity of the reactive fluid in the porous packing, and $D_T$ the heat conductivity of the liquid-solid medium. $v$ is the velocity of fluid based upon the empty cross-section of reactor (the actual mean velocity of the fluid inside the porous packing is equal to $v/\nu$). A and E are the Arrhenius parameters, $v_f^{-1}$ is the residence time of fluid in the reactor determined by the rate of cross-flow, and $c_0$ and $T_0$ the concentration and the temperature of the injected fresh reagent A. $\rho_f$ and $C_f$ are the density and the specific heat capacity of the reacting fluid, and $\rho_s$ and $C_s$ the same quantities for solid packing. Q is the heat of reaction, $\chi_N$ the surface heat transfer coefficient, S the reactor walls surface area, $T_w$ the wall temperature, and V the volume of the reactor.

Further we introduce the dimensionless variables and parameters $$x_1 = (c_0 - c)/c_0,\ x_2 = \gamma(T - T_0)/T_0,\ \gamma = E/RT_0,$$

$$\tau = tv/\epsilon L,\ \xi = z/L,\ Pe_1 = vL/D_c,\ Pe_2 = vL\rho_f C_f/D_2,$$

$$Da = Ae^{-\gamma}L/v,\ B = Qc_0\gamma/\rho_f C_f T_0,\ \beta_r = v_f L/v,$$

$$\beta_N = \chi_N SL/V v \rho_f C_f,\ Le = [\epsilon \rho_f C_f + (1-\epsilon)\rho_s C_s]/\epsilon \rho_f C_f \qquad (12)$$

where L is the reactor length, variable $x_1$ represents the extent of the reaction (or scaled concentration of the reagent B), $Pe_1$ and $Pe_2$ are the Peclet numbers for mass and heat transport, Da the Damköhler number, B the dimensionless adiabatic temperature rise for the empty reactor (without packing), and Le the Lewis number, Substitution of (12) into (11) results in $$\dot{x}_1 = f(x_1, x_2) + (Pe_1^{-1} \partial_\xi^2 - \partial_\xi)x_1,$$

$$\dot{x}_2 = g(x_1, x_2) + Le^{-1}(Pe_2^{-1} \partial_\xi^2 - \partial_\xi 6)x_2, \qquad (13)$$

where the dot denotes the derivatives with respect to dimensionless time $\tau$, and $$f(x_1, x_2) = Da(1 - x_1)e^{x_2/(1 + x_2/\gamma)} - \beta_r x_1,$$

$$g(x_1, x_2) = Le^{-1}[BDa(1-x_1)e^{x_2/(1+x_2/\gamma)} - \beta_r x_2 - \beta_N(x_2 - x_{2w})],$$

and $$x_{2w} = x_2|_{T_w}. \qquad (14)$$

The spatially uniform steady-state solutions $x_1^{(0)}, x_2^{(0)}$ of eqs. (13,14) are found from the algebraic system $$f(x_1^{(0)}, x_2^{(0)}) = 0$$

$$g(x_1^{(0)}, x_2^{(0)}) = 0 \qquad (15)$$

The stability of these solutions is obtained by linearizing eqs. (13,14) near the steady state. The linearization results in $$\dot{\bar{x}}_1 = a_{11}\bar{x}_1 + a_{12}\bar{x}_2 + (Pe_1^{-1} \partial_\xi^2 - \partial_\xi)\bar{x}_1,$$

$$\dot{\bar{x}}_2 = a_{21}\bar{x}_1 + a_{22}\bar{x}_2 + Le^{-1}(Pe_2^{-1} \partial_\xi^2 - \partial_\xi)\bar{x}_2. \qquad (16)$$

In (16), $x_m = x_m - x_m^{(0)}$ (m=1,2), and the Jacobian matrix $a_{mn}$ (n=1,2) is given by $$a_{mn} = \begin{pmatrix} \partial f(x_1,x_2)/\partial x_1, & \partial f(x_1,x_2)/\partial x_2 \\ \partial g(x_1,x_2)/\partial x_1, & \partial g(x_1,x_2)/\partial x_2 \end{pmatrix} \qquad (17)$$

where the derivatives are taken at $x_m = x^{(0)}_m$. In the further analysis it is supposed that the stability conditions $$Tr \equiv a_{11} + a_{22} < 0 \text{ and } \Delta \equiv a_{11}a_{22} - a_{12}a_{21} > 0 \qquad (18)$$

of the local system $$\dot{x}_1 = f(x_1, x_2)$$

$$\dot{x}_2 = g(x_1, x_2) \qquad (19)$$

are fulfilled.

However, in the region of the parameter space where one of the diagonal matrix elements $a_{mm}$ is positive (another one negative so that the trace Tr is negative), the spatially extended system (13,14) may be subject both to the Turing instability and to the differential flow induced chemical instability as discussed above for the general two variable case. The variable (sub-system) corresponding to the positive $a_{mm}$ is here referred to as an activator while the other is called an inhibitor, in agreement with the terminology adopted in the literature on the Turing instability. Another necessary condition for both instabilities, as is noted above, is the differential transport of the sub-systems that disengages activator from the local inhibitor response and allows the fluctuations in the activator sub-system to grow. This ultimately leads to instability of the system as a whole. In the system (13,14) (or in its linearized version (16,17), the scaled velocity of the convective mass transfer is equal to unity while that for the heat is Le times less, guaranteing the differential flow. Physically, the spatially fixed reactor packing serves as a thermal reservoir which slows down the rate of heat transport.

Note that the diffusive transfer of heat is suppressed due to the presence of the packing in a similar way as the convective transport. In the system (13,14), as it will be seen below, heat plays a role of an activator while the matter represents an inhibitor. This means that at high enough values of the Lewis number Le, diffusivity of the inhibitor may become greater than that of the activator and the transport condition for the Turing instability may be fulfilled.

Formally, the stability of the system (13,14) is explored through the spatial Fourier expansion $$\bar{x}_m(\xi,\tau) = \int \bar{x}_{m\kappa}(\tau) e^{-i\kappa\xi} d\kappa \qquad (20)$$

Substitution of (20) into (16) leads to equations for the Fourier components $$\bar{x}_{1\kappa} = A_{11}\bar{x}_{1\kappa} + a_{12}\bar{x}_{2\kappa},$$

$$\bar{x}_{2\kappa} = a_{21}\bar{x}_{1\kappa} + A_{22}\bar{x}_{2\kappa}, \qquad (21)$$

where $$A_{11} = a_{11} + i\kappa - \kappa^2/Pe_1, \quad A_{22} = a_{22} + (i\kappa - \kappa^2/Pe_2)/Le \qquad (22)$$

The signs of the real parts of eigenvalues $$\lambda_{1,2}(\kappa) \equiv \lambda'_{1,2}(\kappa) + i\lambda''_{1,2}(\kappa) = (A_{11} + A_{22})/2 \pm [(A_{11} + A_{22})^2/4 - A_{11}A_{22} + a_{12}a_{21}]^{\frac{1}{2}} \qquad (23)$$

of the system (21,22) determine whether the perturbation of the steady state with wavenumber $\kappa$ decays or grows.

Figure 8A:
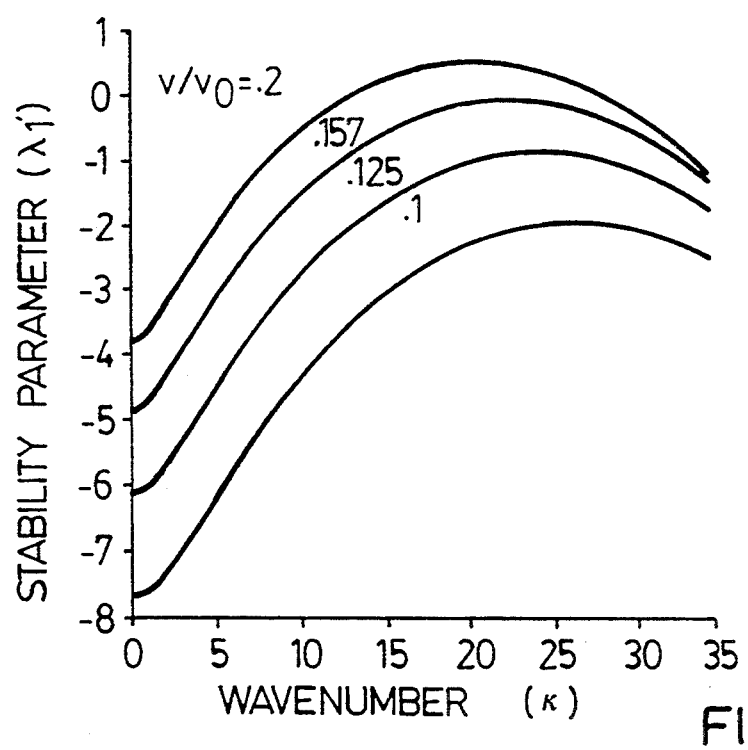
FIG. 8a illustrates the dispersion relations for the cross-flow reactor of FIG. 7 showing the stability parameter $Re\lambda_1 = \lambda_1^1$ plotted against wavenumber $\kappa$ for low flow velocities. The parameters are $\gamma = 20$, $Pe_1 = 180$, $Da = 0.3v_0/v$, $B = 10$, $\beta = \beta_r = \beta_{N=2.7} = 2.7v_0/v$, $Le = 2$, $X_{2W} = 0$.
Figure 8B:
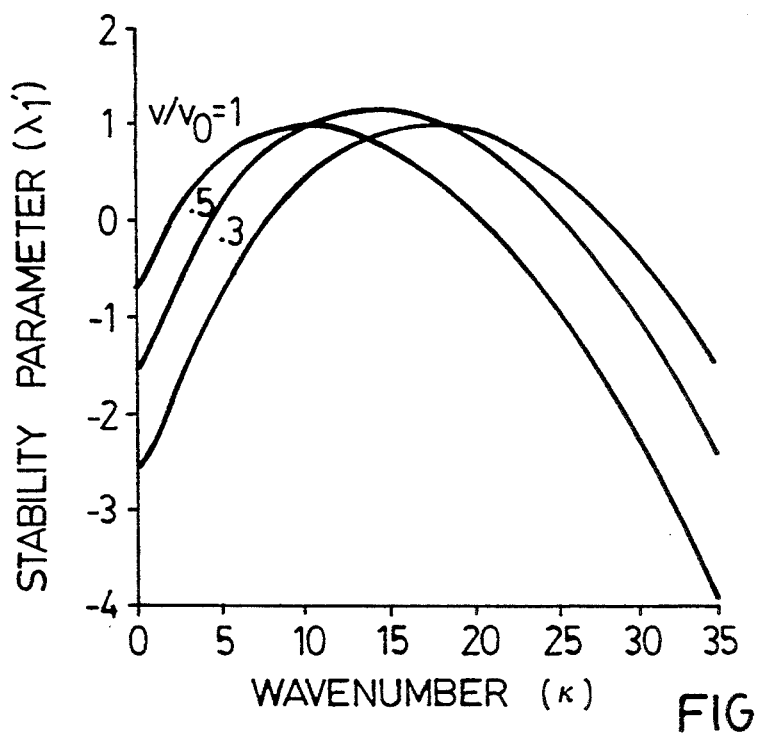
FIG. 8b illustrates the dispersion relations for the cross-flow reactor of FIG. 7 showing the stability parameter $Re\lambda_1 = \lambda_1^1$ plotted against the wavenumber $\kappa$ for high flow velocities. The parameters are $\gamma = 20$, $Pe_1 = 180$, $Da = 0.3v_0/v$, $B = 10$, $\beta = \beta_r = \beta_{N=2.7} = 2.7v_0/v$, $Le = 2$, $X_{2W} = 0$.

In the FIGS. 8a and 8b, $\lambda_1'$ is shown for some range of $\kappa$ and for different flow velocities $v$ ($\lambda_2'$ in all cases was negative). The parameters were chosen so that the Turing instability could not occur by virtue of equality of the turbulent mass and heat diffusivities ($1/Pe_1 = 1/(Pe_2 Le)$). Actually, FIGS. 8a and 8b illustrate modification of the stability properties with the change of differential flow rate in the system since the velocity of relative convective motion of matter and heat $\delta v$ is proportional to the matter flow velocity: $\delta v = v(1 - 1/Le)$. When calculating data for the FIGS. 8a and 8b, the estimative formula $D_c \sim vd$ was used for the effective turbulent diffusivity, where the catalyst particle diameter d plays a role of the free path length. In this approximation, Peclet number for the mass transport is velocity independent: $Pe_1 \sim 1/d$. It was also assumed that $Pe_2 = Pe_1/2$ K. F. Jensen, and W. H. Ray, Chem. Eng. Sci. 37, 199 (1982). The velocity dependent parameters were represented in the form $Da = Da_0(v_0/v)$, $\beta_N = \beta_{N0}(v_0/v)$, and $\beta_r = \beta_{r0}(v_0/v)$ where $v_0$ is some characteristic velocity. The typical values, see K. F. Jensen, and W. H. Ray, Chem. Eng. Sci. 37, 199 (1982) $Da_0 = 0.3$, $\beta_{N0} = 2.7$ were used for calculations, and it was supposed that $\beta_{r0} = \beta_{N0}$.

At the low flow rates $v$, the stability parameter $\lambda_1'$ is negative in the entire wavenumber range of perturbations (FIG. 8a) that means that the spatially homogeneous steady state of the system is stable, As $v$ increases, $\lambda_1'$ grows at any $\kappa$, and the dispersion curve $\lambda_1'(\kappa)$ goes up as a whole. At some critical flow velocity $v_c$ ($v_0 \approx 0.157$) the dispersion curve touches the $\kappa$-axis, and at $\mu > v_c$ there is the interval of wavenumbers for which $\lambda_1'$ is positive. The perturbations with such $\kappa$'s grow that ultimately lead to formation of a new state of the system. For yet higher values of $v$ (FIG. 8b), the effect of growth of the turbulent diffusivity with the increase of the flow rate manifests itself in the crossing of dispersion curves, On the one hand, critical wavenumber $\kappa_c$ (the lower limit of the interval of "unstable" $\kappa$'s) decreases with growth of the differential flow, that represents the typical DIFICI behaviour as seen above. On the other hand, short-wavelength cutoff of the $\kappa$-interval of instability happens for lesser $\kappa$ due to increased diffusion. As a result, the interval of "unstable modes" moves to the left as $\kappa$ increases.

Figure 9:
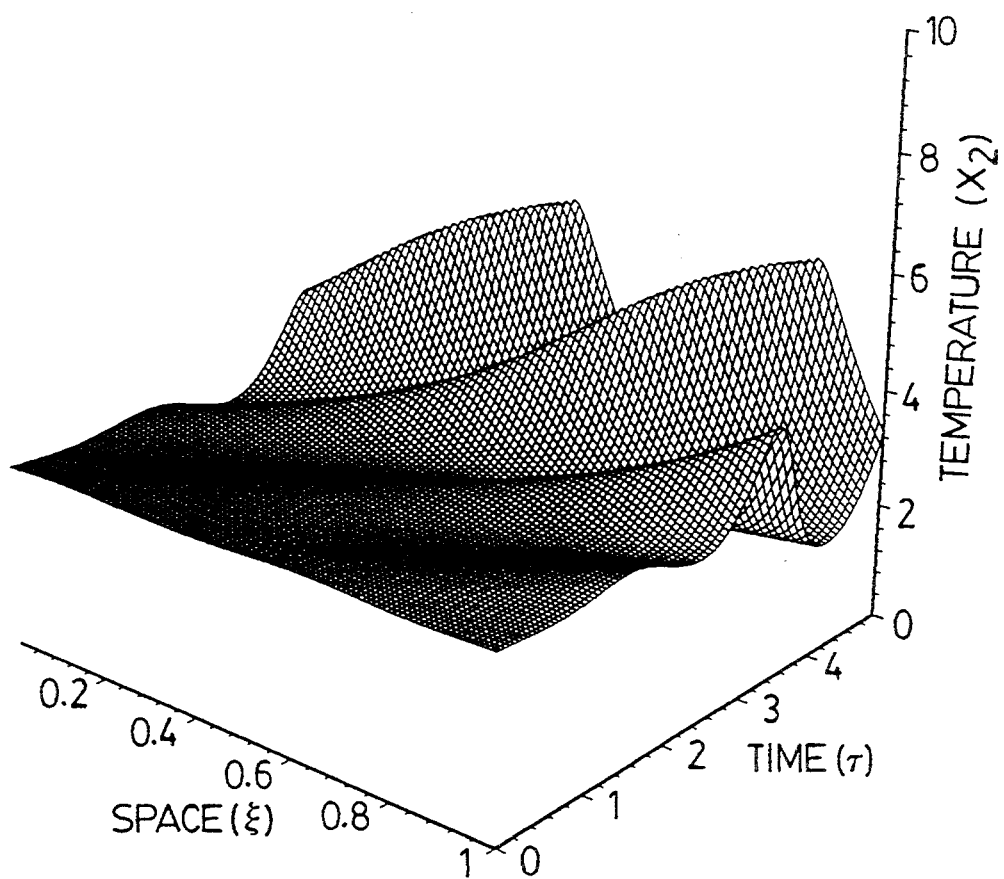
FIG. 9 illustrates the early stage of development of the instability: spatiotemporal behaviour of the temperature of medium in the reactor of FIG. 7. The values of parameters are the same as those for FIG. 8 at $v = v_0/2$.
Figure 10A:
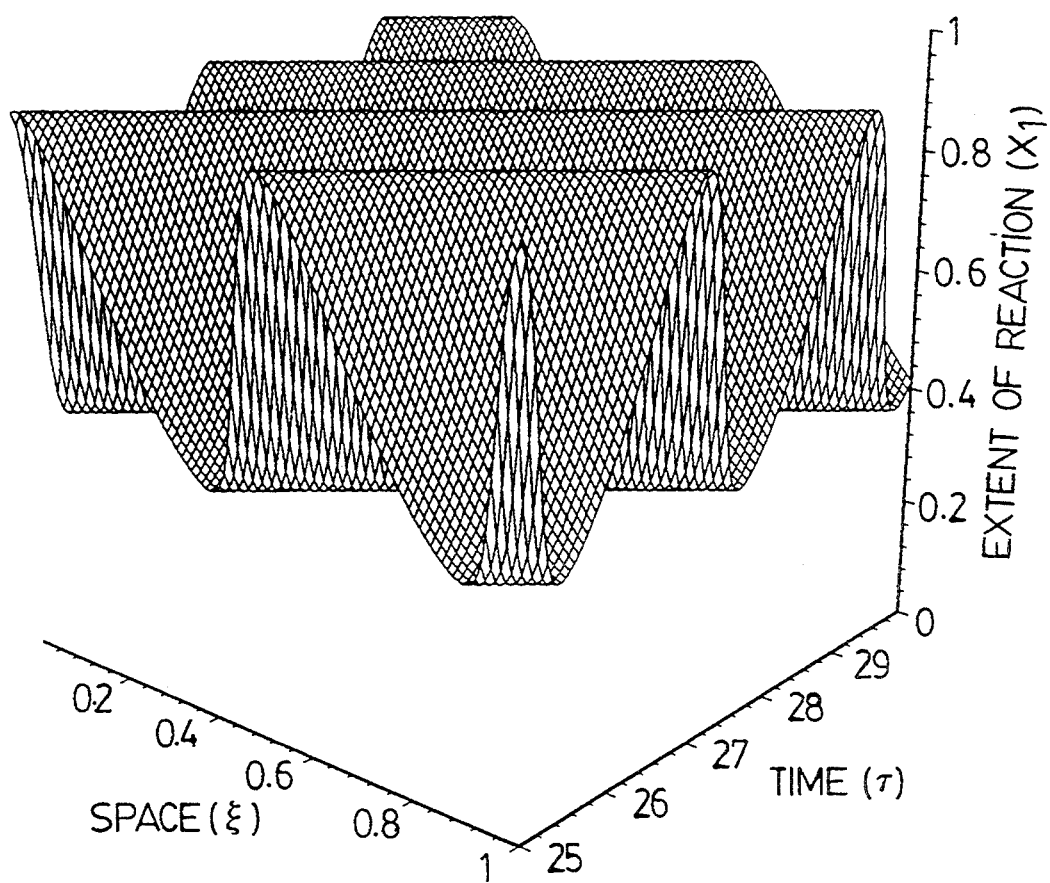
FIG. 10a shows the developed DIFICI waves of the extent of reaction (scaled concentration of the reagent B) moving in the positive direction of the $\xi$-axis.

As was shown theoretically above and observed experimentally above, the DIFICI is an instability of the travelling wave type. Its dynamic consequence is the formation of spatiotemporal patterns representing spatially inhomogeneous profiles of the key species moving through the system. FIG. 9 and FIGS. 10(a),(b) demonstrate such DIFICI pulses of the temperature and the extent of the reaction travelling along the circular reactor. They have been obtained by numerical integration of the equations (13,14) with periodic boundary conditions $x_m(\tau,\xi) = x_m(\tau\xi + 1)$. Values of the parameters are the same as those for FIGS. 8a and 8b with $v = v_0/2$. For these conditions $a_{11} = -14.00$, $a_{22} = 7.06$, $Tr = -6.93$, $\Delta = 8.28$, $x^{(0)}_1 = 3.07$, and $x^{(0)}_2 = 0.614$. Thus, the heat plays a role of the activator ($a_{22} > 0$), and the matter represents the inhibitor. The conditions (18) of stability of the local system (19) are fulfilled in this case and, hence, the spatially homogeneous steady state $x^{(0)}_1$, $x^{(0)}_2$ loses its stability through the DIFICI mechanism.

FIG. 9 demonstrates the development of the spatiotemporal temperature patterns in the system. As the initial state of system was taken spatially uniform steady state slightly modified by applying the perturbation with the wavenumber $\kappa = 4\pi$. As seen from the dispersion relations shown in FIGS. 8a and 8b, this perturbation has, in the linear approximation, the maximal growth rate among all the perturbations allowed by the periodic boundary conditions. The amplitudes of the temperature pulses increase as they propagate in the direction of the flow. This growth slows down at the nonlinear stage of evolution. The development of the DIFICI from the randomly perturbed steady state led, after slightly different transient, to the same ultimate state of the system.

Figure 10B:
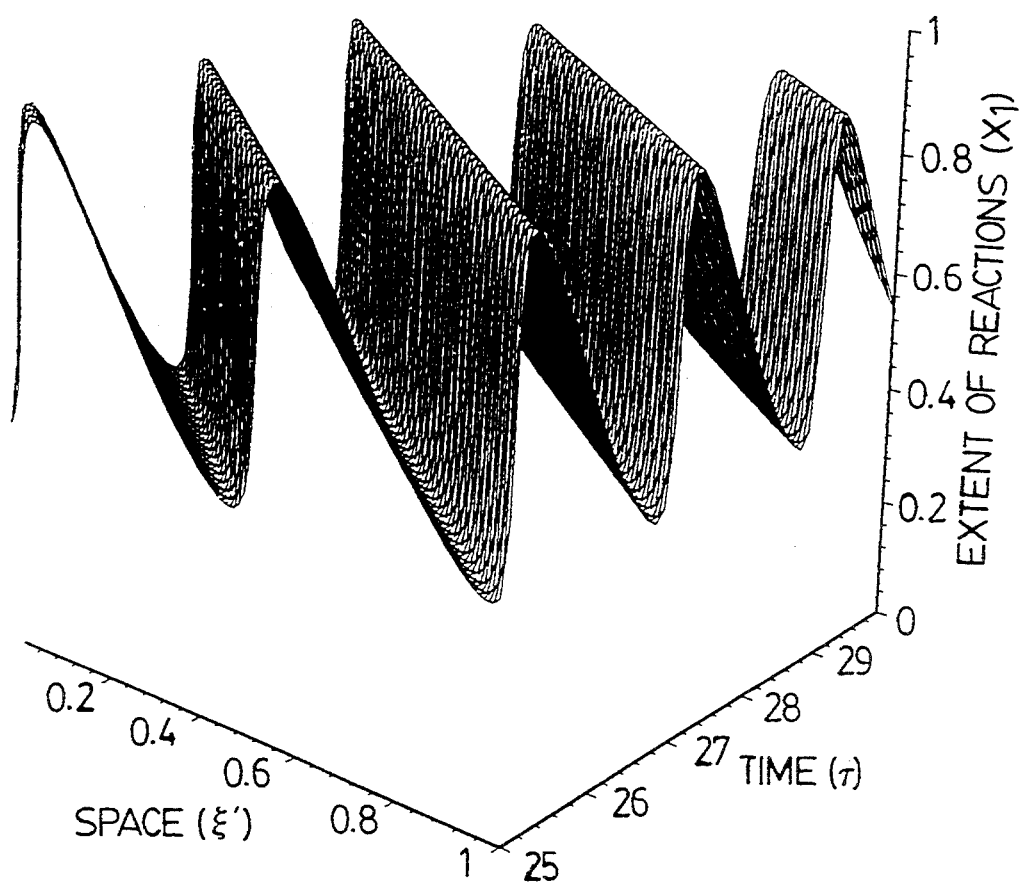
FIG. 10(b) illustrates the same waves as in FIG. 10(a) but shown in the coordinate frame moving with the flow velocity of activator $1/Le = 0.5$; the waves propagate in the negative direction of the $\xi'$-axis ($\xi' = \xi - \tau/Le$).

The fully developed DIFICI waves of extent of reaction are shown in the FIG. 10(a). They move in the direction of matter flow, maintaining their shape and with the constant velocity $V_{pattern} = 0.23$, significantly less than the velocity of the heat flow $1/Le = 0.5$, in all other computations the same behaviour was observed. This means that in the coordinate frame moving with activator flow, where there is only convective motion (that of inhibitor), the direction of propagation of the DIFICI waves was opposite to the direction of this motion. FIG. 10(b), showing the waves corresponding to FIG. 10(a) in the activator frame, demonstrates this upstream propagation. The same effect was observed for the Puschinator model of the Belousov-Zhabotinsky reaction.

In the case when initial perturbation of the steady state contained the only wavenumber $\kappa=6\pi$, in the final state of the system three peaks of temperature and concentration were present unlike the two-peak state shown in FIGS. 10(a) and 10(b). This demonstrates that the system possesses the property of multiplicity. The initial states characterized by $\kappa=2\pi$ or by $\kappa=6\pi$ did not survive and led ultimately to the state shown in FIGS. 10(a),(b).

ii) Spatial Destabilization of Oscillating States

Figure 11:
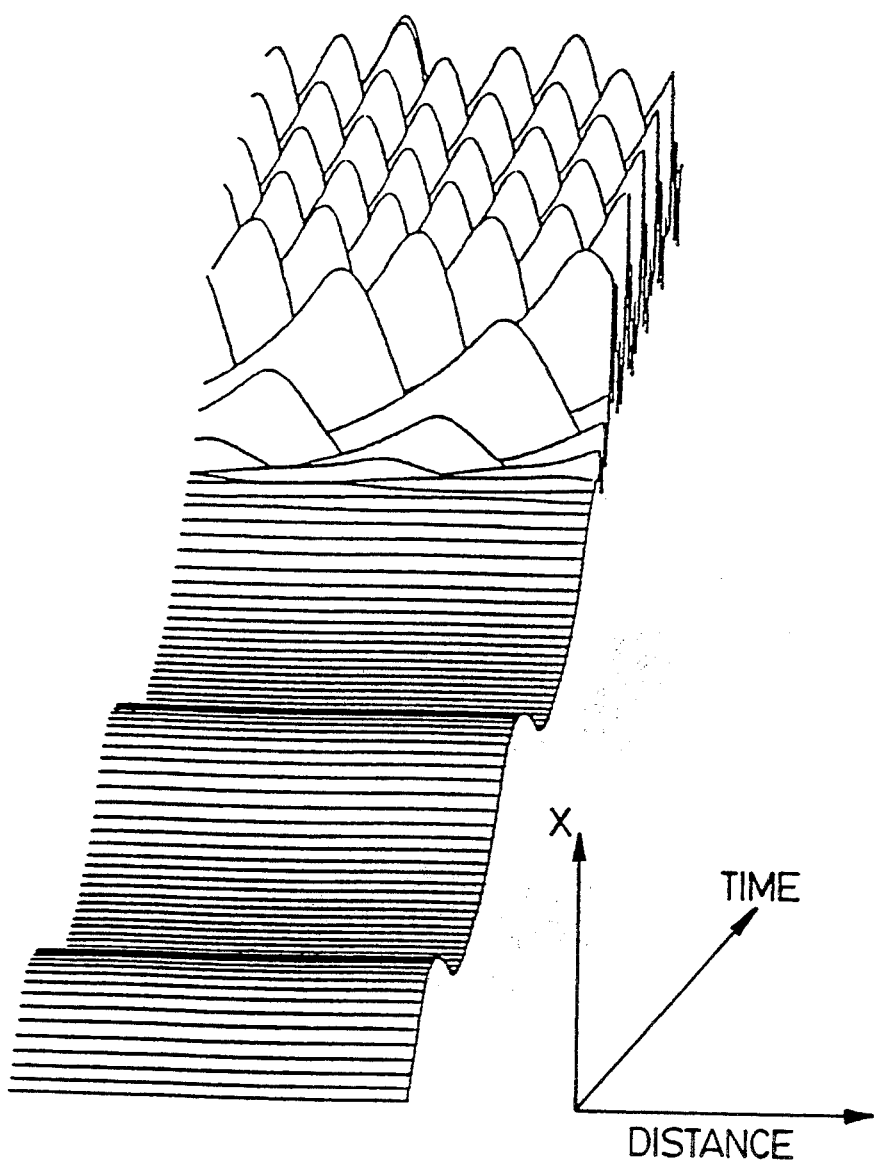
FIG. 11 shows a space-time plot of the concentration of ferroin (the inhibitor) in the Puschinator model of the BZ reaction. Initially, the differential flow is off and the system oscillates homogeneously. After some time the flow is switched on. Travelling DIFICI-induced waves develop. Note the greatly enhanced frequency and product yield. System parameters are $A = 0.1$, $B = 0.29$, $C = 0.0001$, $h_0 = 0.1$.

While the above analyses dealt explicitly with the destabilization of a homogeneous, stable steady state of activator/inhibitor systems (see the stability conditions following (2) or (18)), it can be shown numerically that the DIFICI applies equally well to time-periodic states (limit cycles). This is illustrated by FIG. 11, where the Puschinator model of the BZ reaction is tuned, in the absence of flow, to the oscillatory domain. The switching on of the differential flow after some time is seen to destabilize the homogeneously oscillating state and to give rise to spatiotemporal structures (travelling waves). There are good reasons to expect that aperiodic (chaotic) dynamic states may equally be destabilized. These findings considerably expand the class of systems that may be affected by the DIFICI. The enhancement of oscillation frequency and amplitude that is evident from FIG. 11 will be taken up in section iii) below.

iii) Enhancement of Reaction Yields, Rate and Power Output

Figure 12A:
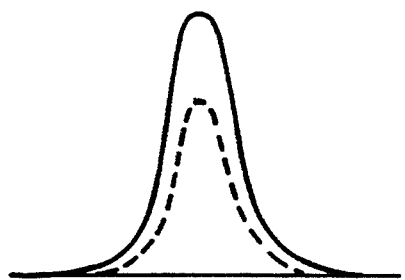
FIG. 12 diagrammatically represents the destabilization of the homogeneous steady state by differential flow, with FIG. 12(a) representing the absence of differential flow, where the homogeneous steady state is stabilized through the action of the inhibitor.
FIG. 12(b) shows the uncoupling of activator and inhibitor through differential flow which allows both activator and inhibitor to grow locally beyond the levels where no differential flow is present.
Figure 12B:
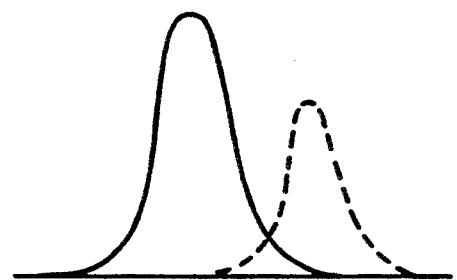

An important consequence of the decoupling of subsystems through a differential bulk flow are the enhancement of reaction rates and product yields. This may be understood on hand of the activator/inhibitor system, illustrated schematically in FIGS. 12(a) and 12(b), where the spatially uniform concentrations $X_0, Y_0$ of the system in its stable steady state are schematically shown by the horizontal line. The case without differential flow is illustrated by FIG. 12(a). Here the evolution of a random fluctuation of the activator, represented by the full bell shaped curve, is examined to test the stability of the homogeneous steady state. This fluctuation is prevented from growing through the inhibitor which is generated from the activator with the same spatial distribution as the former and is represented by the dashed curve: hence the steady state $X_0, Y_0$ is stable in the absence of a differential flow. FIG. 12(b) illustrates the role of a differential flow in decoupling and destabilizing the homogeneous steady state. The displacement of the inhibitor from its place of formation by the differential flow allows the activator to grow locally, while its spreading is prevented by lateral inhibition as disclosed in H. Meinhardt, Models of Biological Pattern Formation (Academic Press, 1982). J. D. Murray, Mathematical Biology, (Springer Verlag, Berlin, 1989). L. Segel and J. L. Jackson, J. Theor. Biol. 37, 545 (1972): the spatial destabilization through the differential flow, which is proved analytically in the patent application, is now Intuitively evident. The point that is crucial in the present context is that in the presence of the differential flow, both activator and inhibitor can grow to levels that are much higher than those they could attain under the homogeneous conditions (i.e. $X_0, Y_0$) depicted by FIG. 12(a).

Figure 13A:
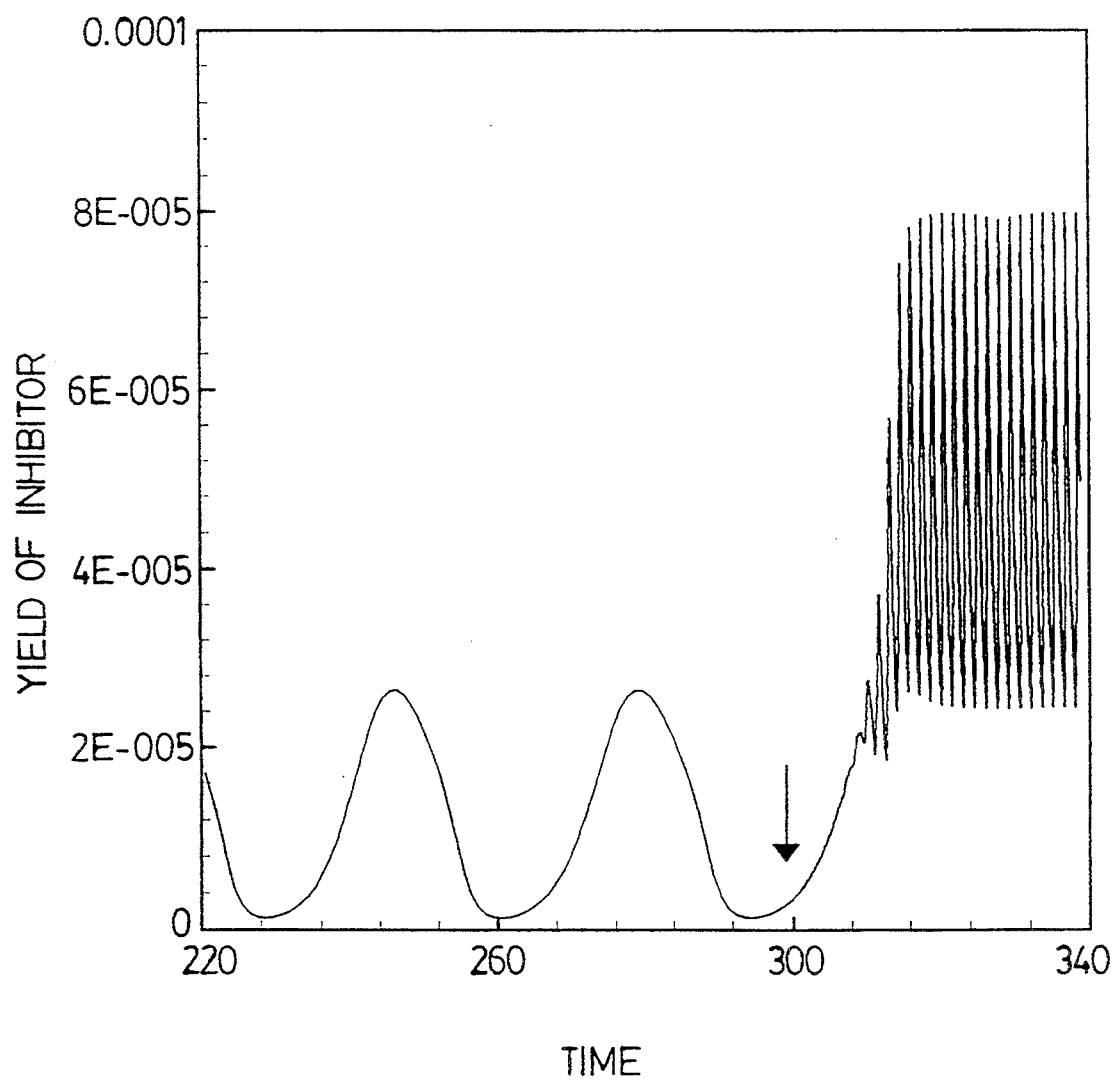
FIG. 13(a) illustrates the time-dependence of the inhibitor ([Fe(phen)$_3$]) yield and FIG. 13(b) illustrates the time-dependence behaviour of the activator ([HBrO$_2$]) yield in the BZ reaction under the same conditions as FIG. 11.
Figure 13B:
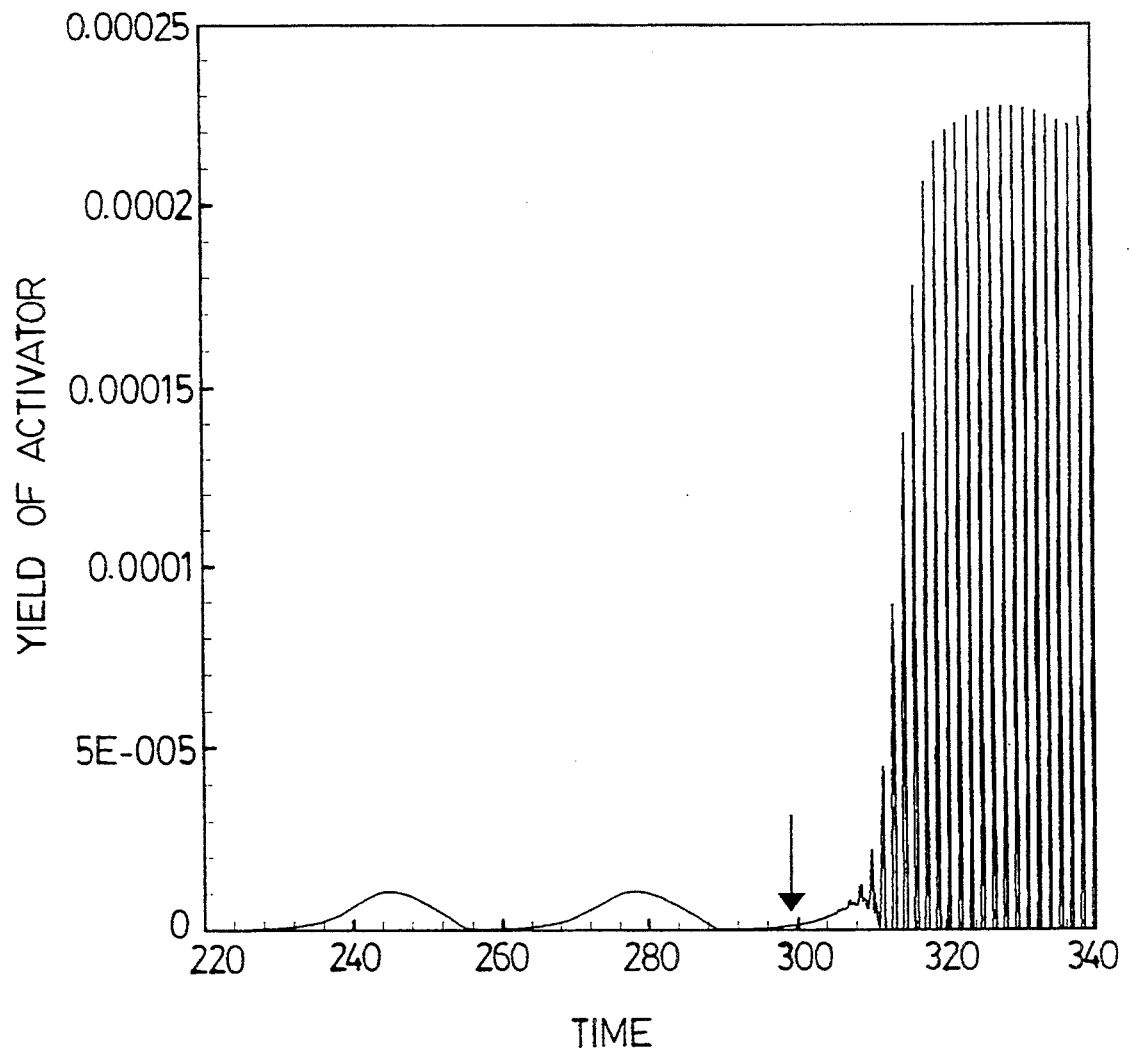
Figure 14:
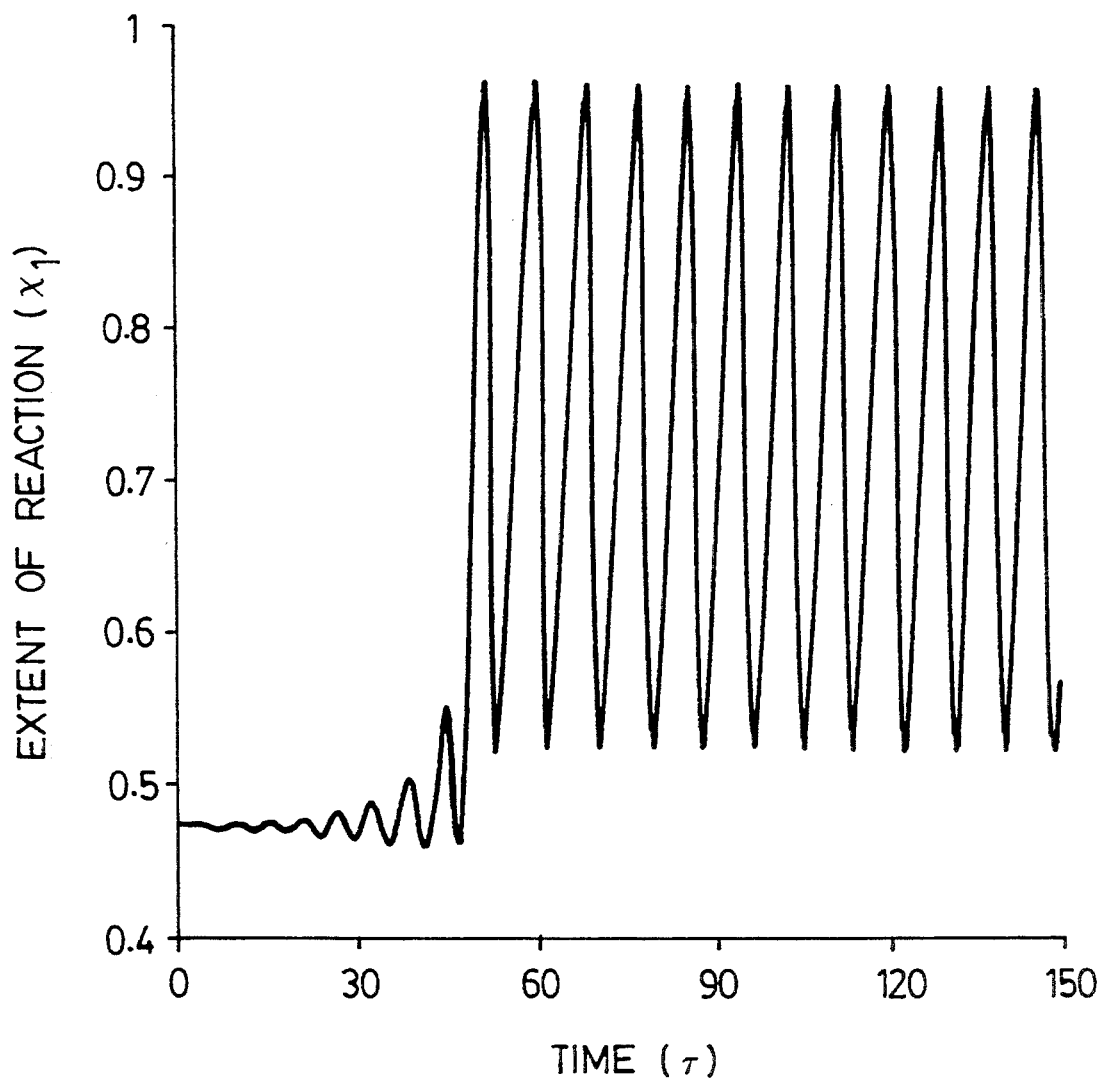
FIG. 14 illustrates the time-dependence of reaction yield ($x_1$) for the exothermic unimolecular reaction. Before switching on the differential flow at $t = 0$, the system is in a stable steady state. Note that in response to the differential flow, the system switches, after some transients, to the high yield DIFICI mode. The flow increases the yield from 0.475 to 0.72 (time averaged), i.e. by 52%.
Figure 15A:
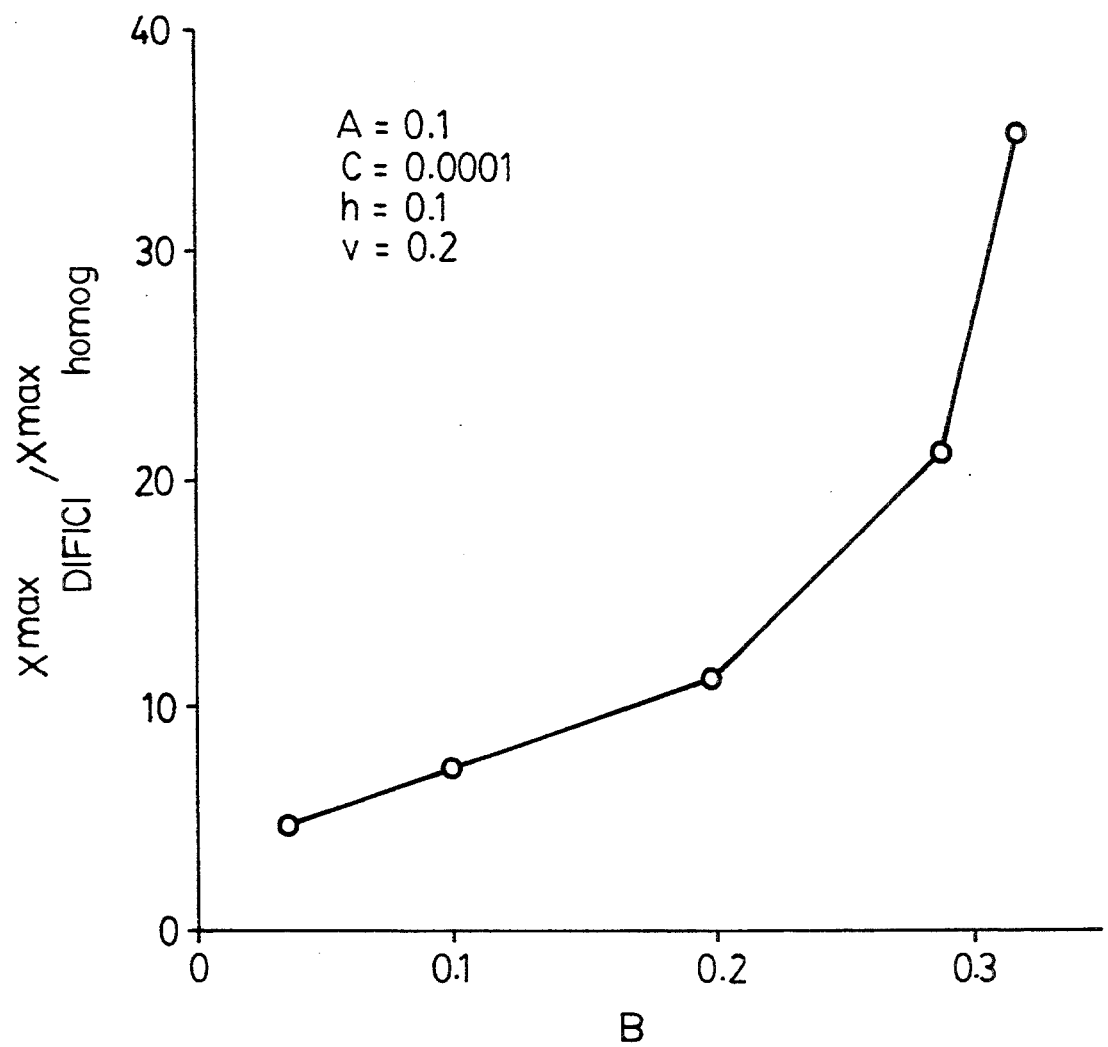
FIG. 15(a) shows the ratio $X_{DIFICI}^{max}/X_{homog}^{max}$ of the peak yield of the activator (X is the concentration of HBrO$_2$) relative to that for a homogeneous limit cycle, as a function of B, the concentration of bromomalonic acid.
Figure 15B:
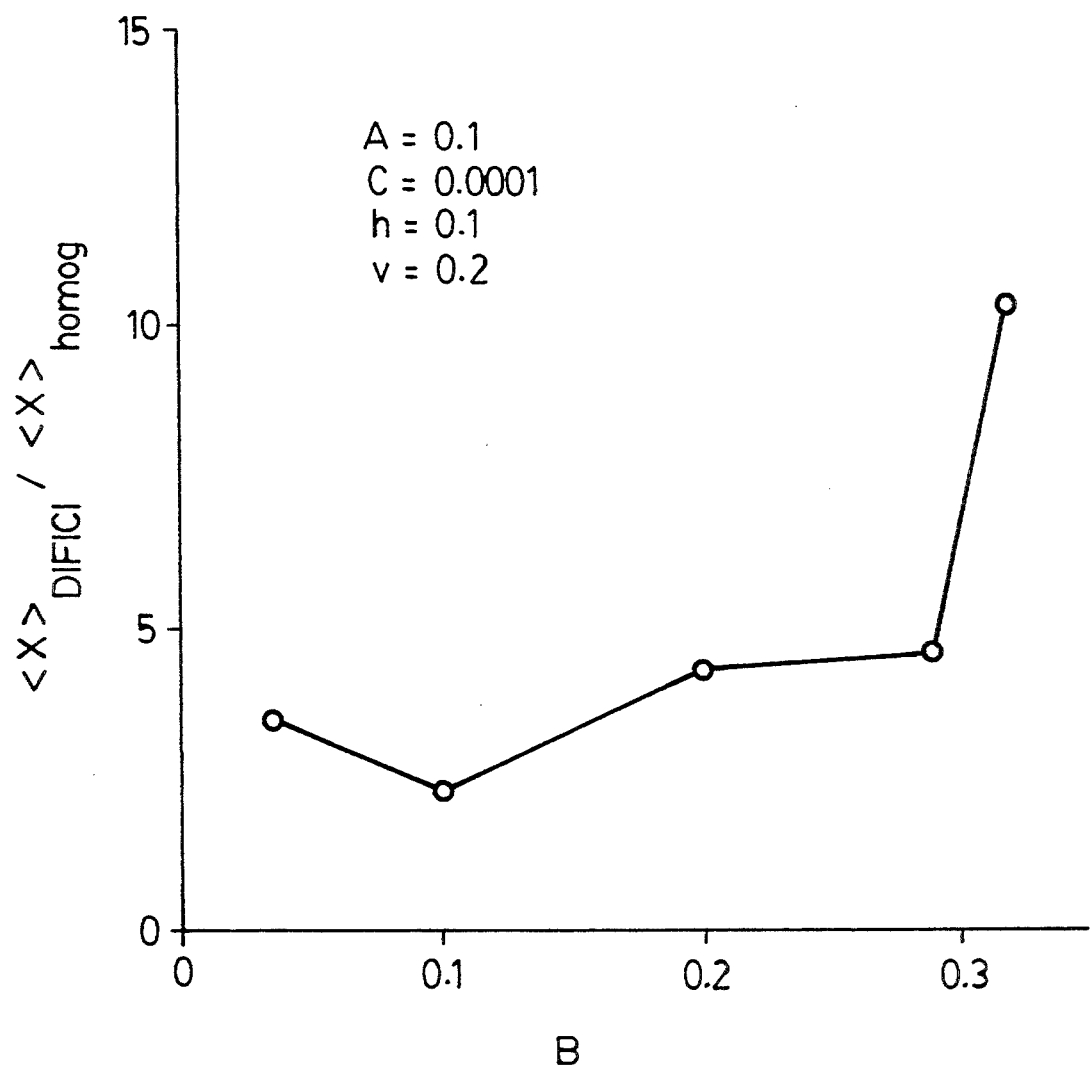
FIG. 15(b) shows the corresponding enhancement of the time-averaged yield $<X_{DIFICI}>/<X_{homog}>$.
Figure 15C:
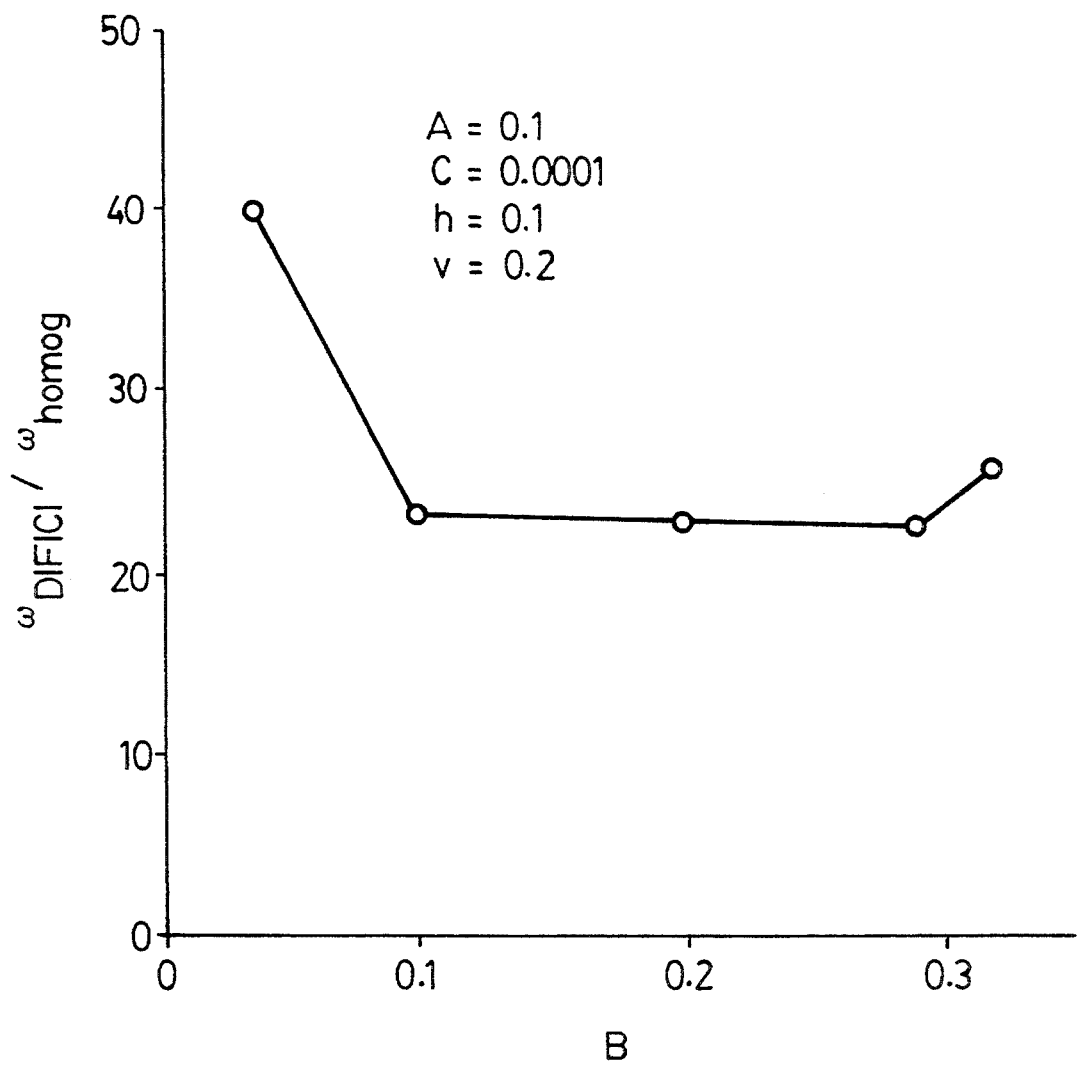
FIG. 15(c) shows the ratio of oscillation frequencies $\omega_{DIFICI}/\omega_{homog}$ under the same conditions. Note that the peak yield and average yield, as well as the oscillation frequency are significantly enhanced by DIFICI.
Figure 16A:
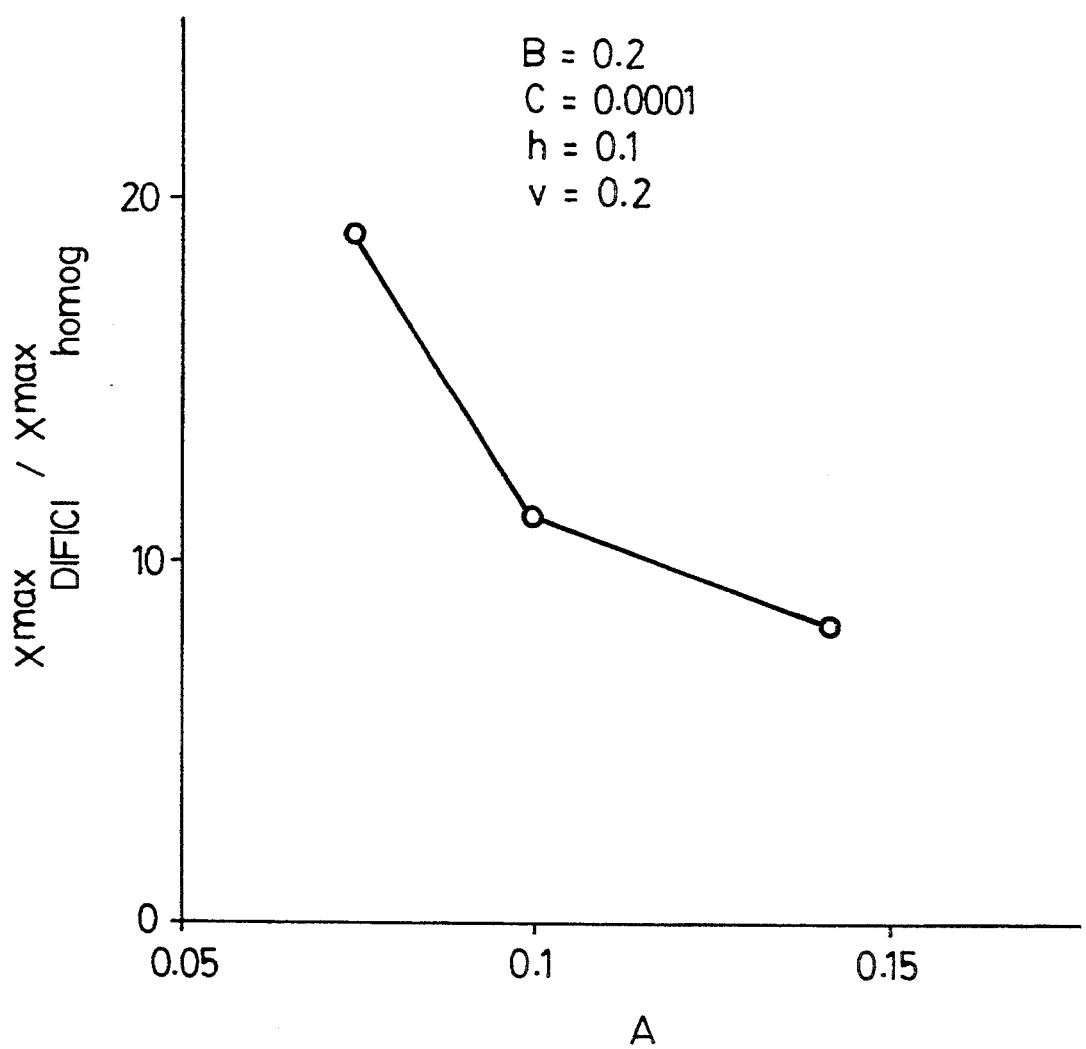
FIG. 16(a) shows the ratio $X_{DIFICI}^{max}/X_{homog}^{max}$ of peak yields of the activator relative to that of the homogeneous limit cycle, as a function of A, the concentration of $BrO_3^-$.
Figure 16B:
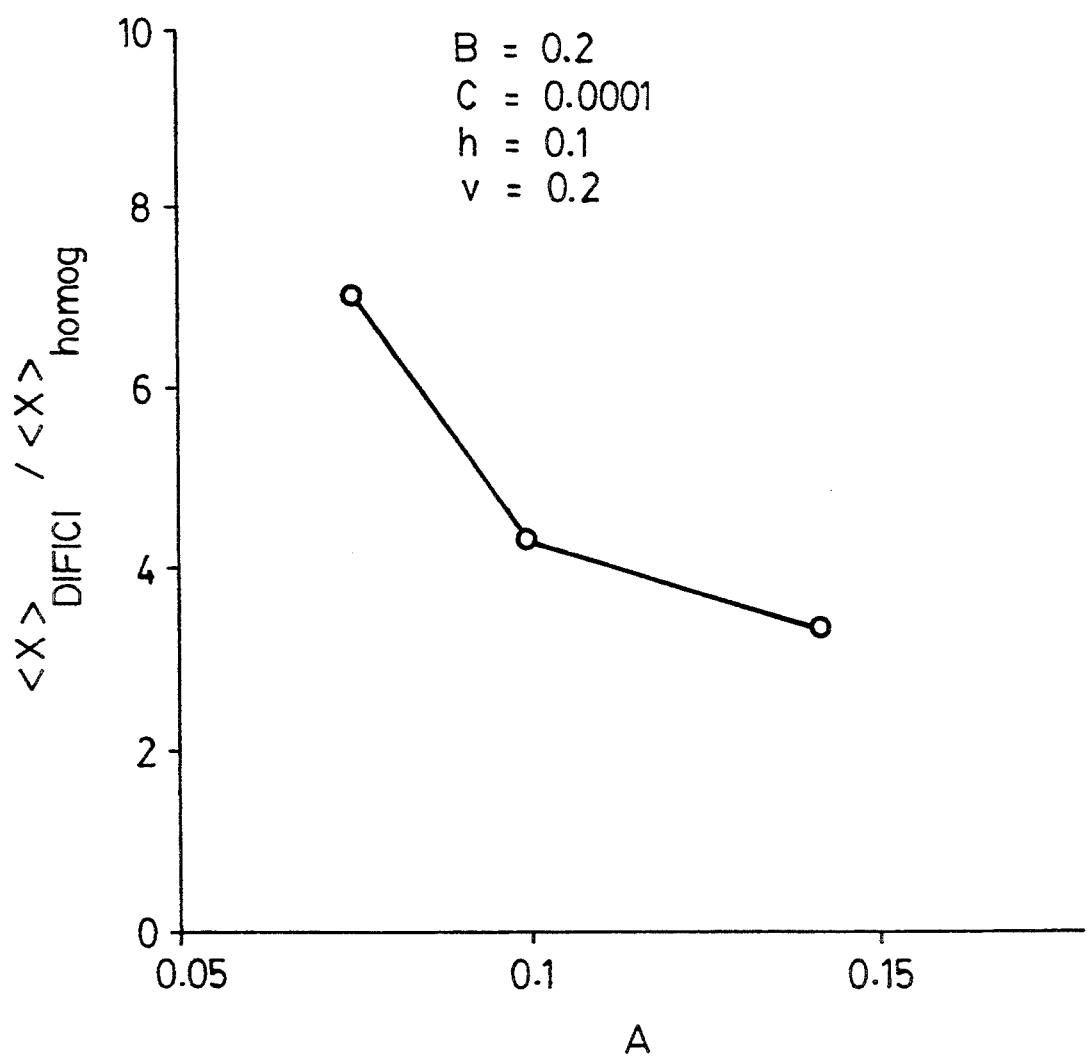
FIG. 16(b) shows the corresponding ratio of the average yields.
Figure 16C:
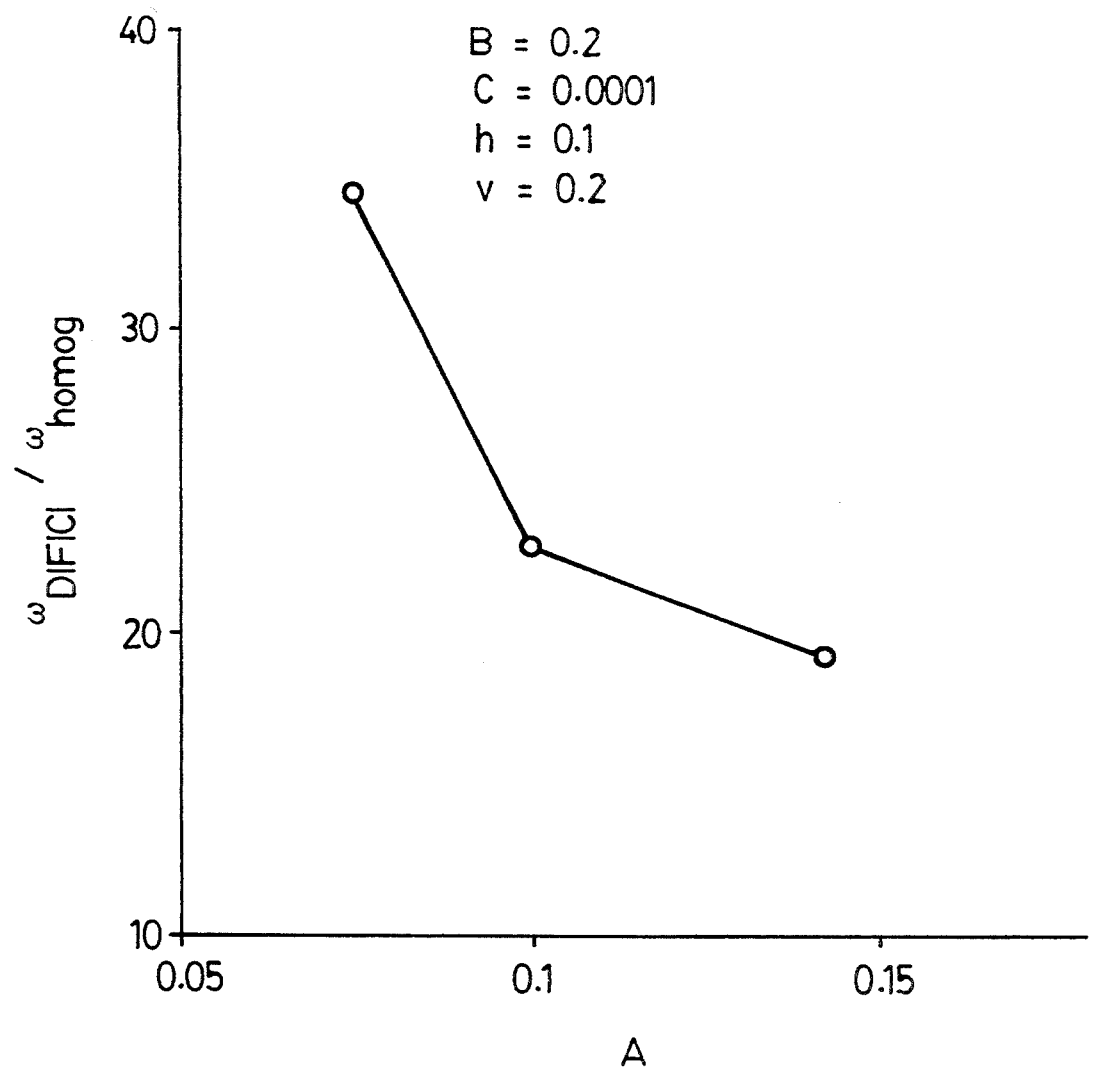
FIG. 16(c) shows the ratio of oscillation frequencies $\omega_{DIFICI}/\omega_{homog}$.
Figure 17A:
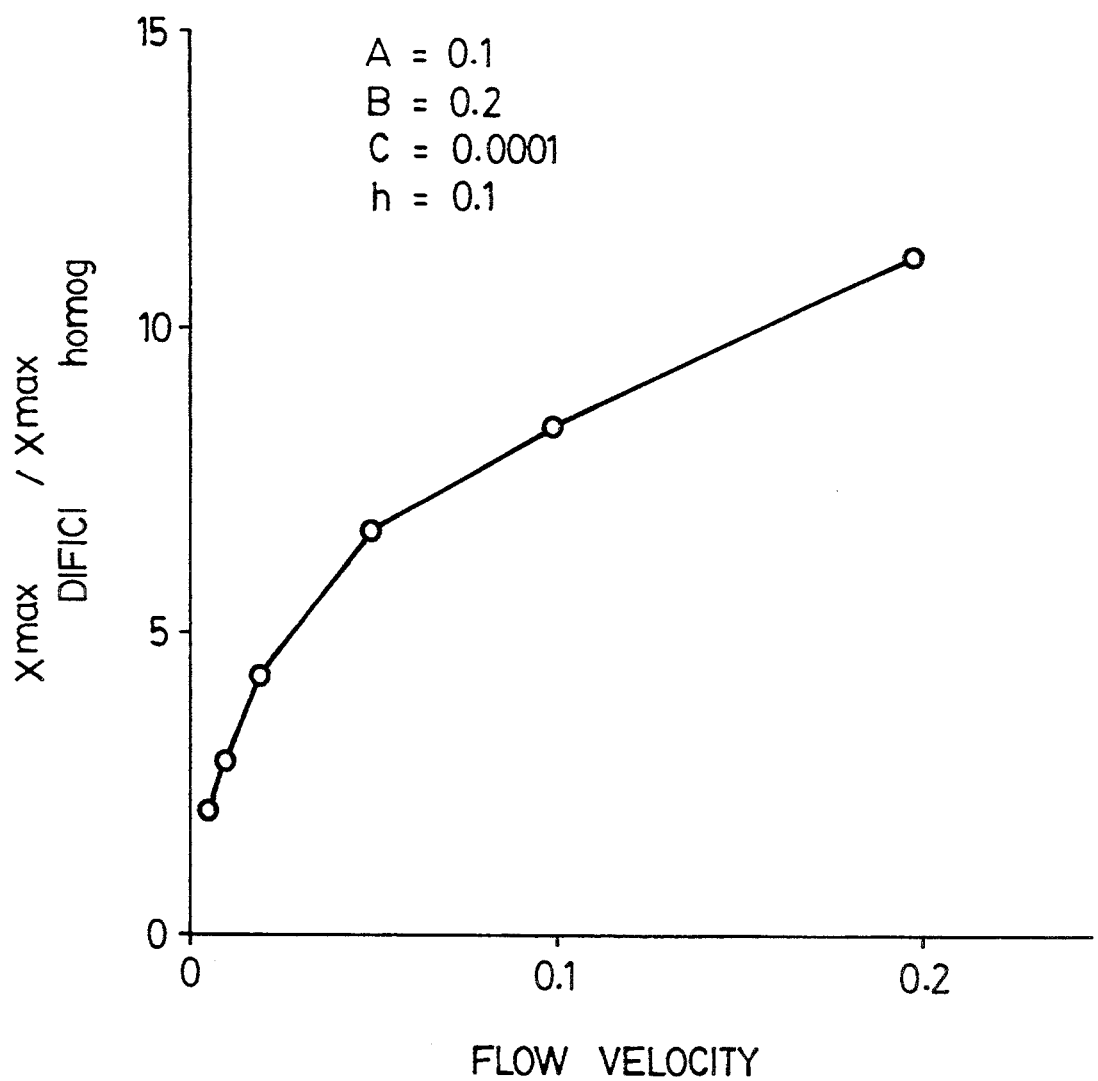
FIG. 17(a) shows the ratio of peak yields of X, the concentration of HBrO$_2$, for the Puschinator as a function of the differential flow rate v.
Figure 17B:
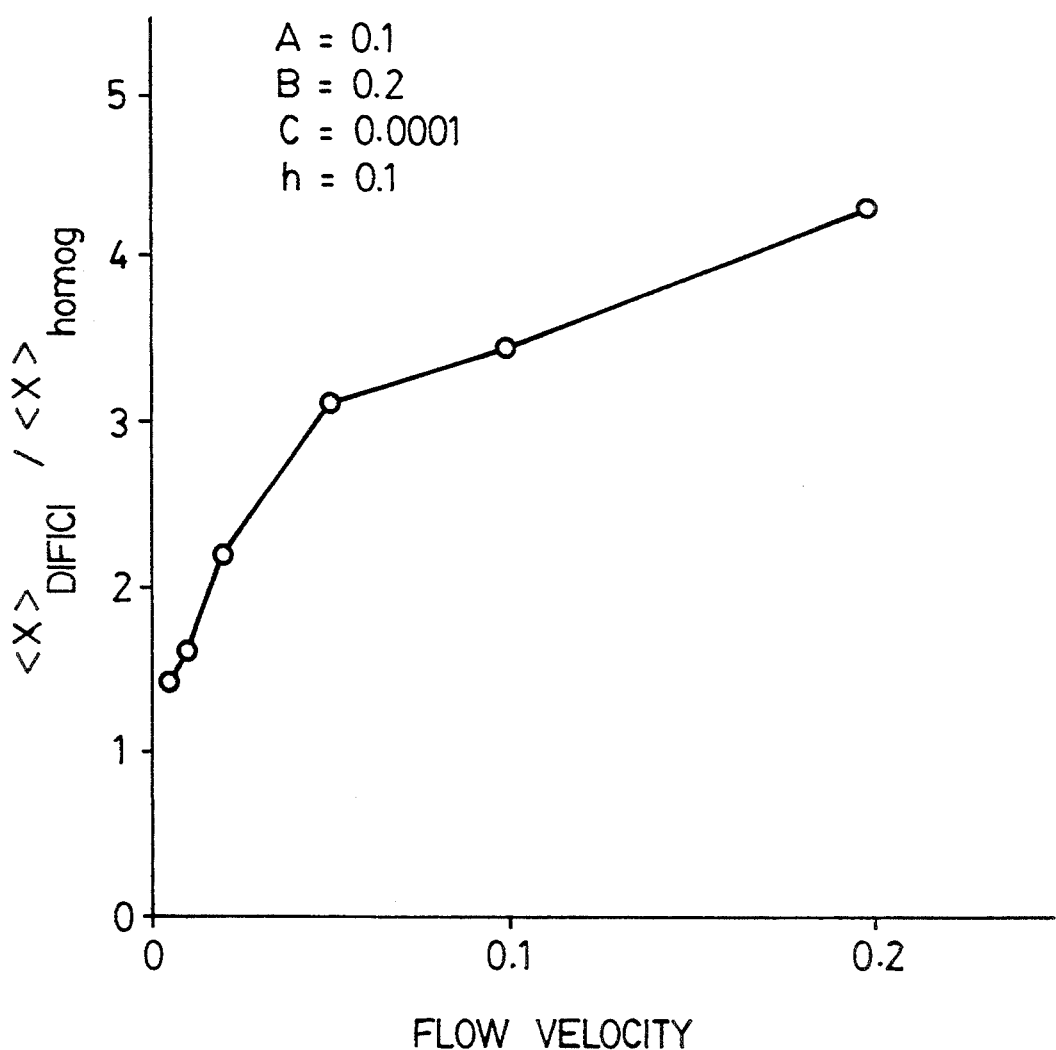
FIG. 17(b) illustrates the corresponding ratio of the average yields. FIG.
Figure 17C:
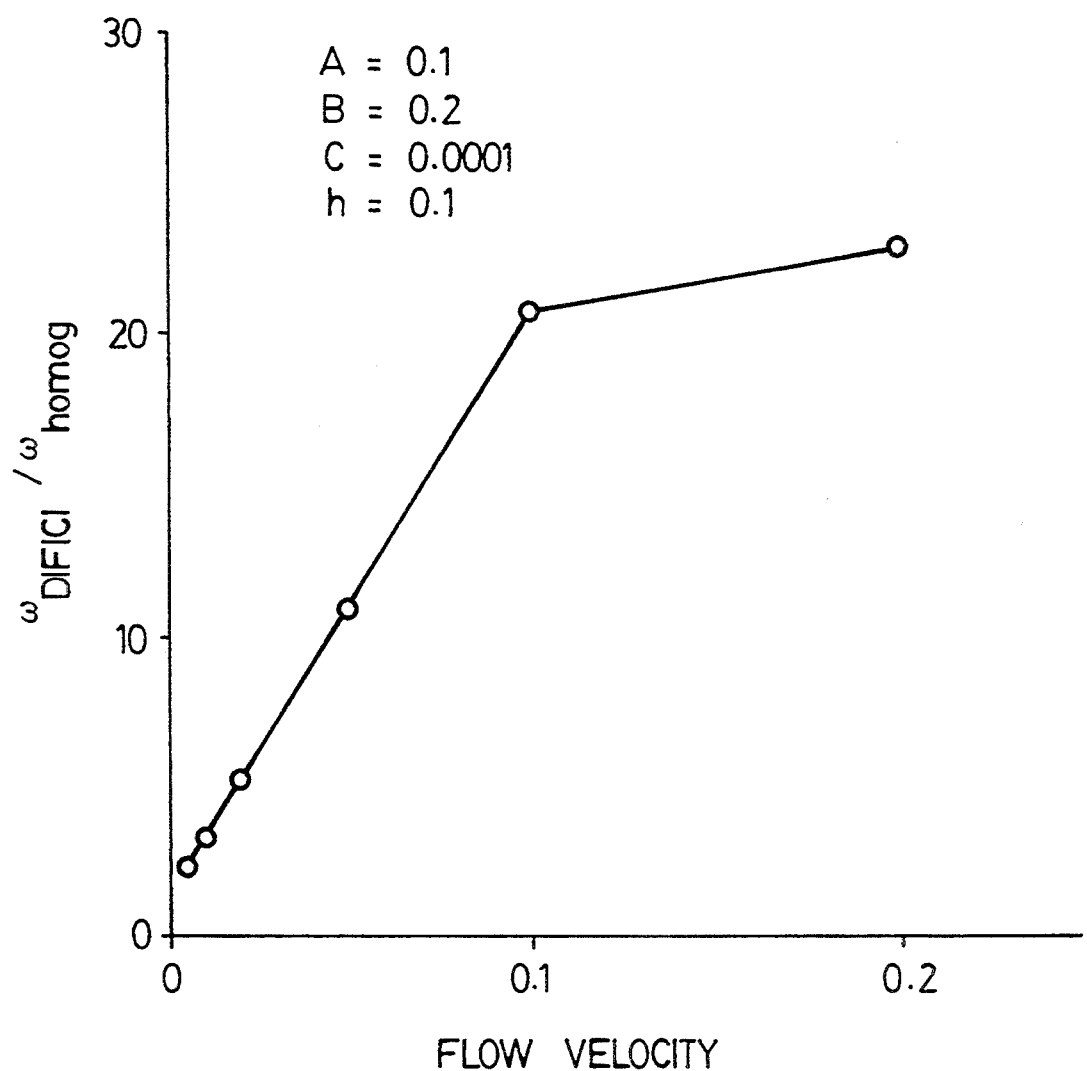

This qualitative insight is substantiated by the computational results for the Puschinator model, shown in FIGS. 13(a),(b) and FIG. 18, and for the exothermic standard reaction, shown in FIG. 14.

in FIGS. 13(a) and (b) the homogeneous oscillatory state of the BZ system is destabilized through differential flow, switched on after some time. Two consequences of the differential flow are apparent: (1) Both the peak yields and the average yields of activator and of inhibitor are enhanced over the corresponding quantities of the homogeneous limit cycle. The average yields are increased by factors of 20 and 4.5, respectively. (2) For an observer fixed in space, the frequency of local oscillations is enhanced by a factor of 23. More detailed parameter dependencies of the ratios of peak concentrations of activator, $X_{DIFICI}^{max}/X_{homog}^{max}$, of the average concentration $<X_{DIFICI}>/<X_{homog}>$, and of the oscillation frequency $\omega_{DIFICI}/\omega_{homog}$ are shown in FIGS. 15, 16 and 17, respectively. FIGS. 15(a),(b) and (c) show the B (concentration of bromomalonic acid) dependence of the above quantities, FIGS. 16(a),(b) and (c) the A (concentration of bromate) dependence, and FIGS. 17(a),(b) and (c), their dependence on the relative flow rate v. It is noted that the peak and average yields, as well as the oscillation frequency at a fixed point in space are enhanced everywhere by the differential flow. In particular the enhancement of the (local) oscillation frequency through the differential flow is very substantial, and very linear at low v. In other words, the spatial decoupling of activator and inhibitor greatly shortens the time scale of chemical relaxation. Consequently, the power output of the reaction may be enhanced. Potential applications in a wide variety of dynamical systems, are apparent to those skilled in the art. For example, referring to FIG. 17(c), the linearity of the enhancement of oscillation frequency over more than a decade at low v may be used as the basis for either an analog-to-digital (A/D) or digital-to-analog converter devices.

Solid catalyst properties are known to be sensitive to a variety of reaction parameters. Operation in a dynamical DIFICI regime may further enhance catalyst properties, thus affecting yields, power output, selectivity and product properties beyond the predictions reached in this and subsequent sections.

Referring to FIG. 17(c), it is apparent that the very linear nature of the ratio of the oscillation frequencies may form the basis of an apparatus for measuring flow velocity through analog-to-frequency transduction, or for analog-to-frequency transduction, in a spatially extended system over the range of flow velocities shown.

Prior efforts to elucidate and manipulate the output of chemical networks dynamically have been reported in Y. Termonia and J. Ross, J. Chem. Phys. 74, 2339 (1981); J. Ross and M. Schell, Ann. Rev. Biophys. Chem. 16, 401 (1987) and Yu. Sh. Matros, Catalytic Processes Under Unsteady State Conditions (Elsevier Publ., Amsterdam, 1989). In particular, Ross et al. have shown that the power output, the dissipation (for isothermal reactions, the product of the reaction rate and $\Delta G$) and the efficiency of nonlinear and homogeneous reactive systems may be modified experimentally, relative to steady state operation, through periodic operation. This can be realized, e.g. through the periodic supply of reactants (periodic forcing), or through autonomous oscillations. Their approach is based on the effect of periodicities on the phase relations between reaction rate and $\Delta G$, which determine the average values of power output, dissipation and efficiency.

The approach of the present invention differs significantly from those described earlier, see Y. Termonia and J. Ross, J. Chem. Phys. 74, 2339 (1981); J. Ross and M. Schell, Ann. Rev. Biophys. Chem. 16, 401 (1987) and Yu. Sh. Matros, Catalytic Processes Under Unsteady State Conditions (Elsevier Publ., Amsterdam, 1989) through the exploitation of the spatial decoupling of counteracting variables. It will be understood by those skilled in the art that by increasing the reaction rate as described, the average power output will be likewise enhanced. The decoupling method described herein is under direct experimental control via the differential flow rate. The previous approaches rest on decoupling in the time domain rather than in the space domain.

iv) Enhancement of Selectivity

In reactions with competing reaction channels, the selectivity (branching ratio) is also expected to depend on a differential flow. For instance, if there are two competing reaction pathways, symbolically A→B and A→C, and the desired channel is susceptible to DIFICI to a greater extent than the competing channel, then the relative and absolute yields of the former will be enhanced Yu. Sh. Matros, Catalytic Processes Under Unsteady State Conditions (Elsevier Publ., Amsterdam, 1989).

v) Product Properties and Quality Enhancement

It is well established in the chemical engineering practice that the physical properties of products of certain chemical processes may depend sensitively on the ways in which the process is performed, see for example K. R. Westerterp, W. P. M. Van Sawaaj, A. A. C. M. Beenakkers, Chemical Reactor Design And Operation (Wiley & Sons, New York, 1984). By concentrating the production in systems susceptible to DIFICI primarily into brief bursts of synthetic activity, those skilled in the art will appreciate that products with unusual properties may be generated.

vi) Systems with Charged Species: Electrolytes, Plasmas, Semi- and Superconductors in External Fields In the case where at least one of the activator or inhibitor means are charged, the differential flow may be achieved by imposing a drift on the charged species. This drift may be imposed using external fields such as magnetic fields, electric gradients or thermal gradients. Obvious applications are in the fields of electrolytes, plasmas, semiconductors and superconductors.

In electrolytes and plasmas in external fields, differential flow arises through the different mobilities of the different charged species, and there may be, in principle different differential flows between each pair of species as long as one is charged.

In semiconducting systems the activation means and the inhibition means may be a voltage and current or vice versa. The differential flow may be achieved by imposing drift on the charge carriers forming the current in the semiconducting system by an external magnetic or electric field applied along a portion of the semiconducting system. Alternatively, the differential flow may be achieved by imposing drift on the charge carriers forming said current by applying heat to at least a portion of the semiconductor.

FIG. 19($a$) illustrates an example of such a system wherein a semiconductor device 60 is subjected to a bias potential $E_1$ along the axial length of the device for inducing an axial drift of charge carriers. Extending along the length of the device there exists a spatially distributed circuitry for applying local bias potentials in the direction perpendicular to the axial direction. The function of the distributed circuitry is to tune the system into the DIFICI region exhibiting the characteristics of an activator/inhibitor system. For simplicity only one local biasing circuit is shown. FIG. 19($b$) illustrates the corresponding equivalent circuit showing only the terminal circuits and an intermediate, representative circuit.

FIGS. 19($a$) and 19($b$) represent a device characterized by an S-shaped current-voltage characteristic. FIGS. 20($a$) and 20($b$) are similar to FIGS. 19($a$) and ($b$) but for a semiconducting device having N-shaped current-voltage characteristics.

Similarly, in superconducting systems the activation means and the inhibition means may be a voltage and current or vice versa. The differential flow may be achieved by imposing drift on the charge carriers forming the current in the semiconducting system by an external magnetic or electric field applied along a portion of the semiconducting system. Those skilled in the art will appreciate that superconducting devices may be represented by FIG. 20 as well.

vii) Biological Systems

A common characteristic of all living systems is their excitability that may occur on several hierarchical levels: genetic, biochemical (e.g. enzymatic) and neuronal. Likewise, oscillatory dynamics is wide-spread in such systems. Both occurrence herald the presence of activation/inhibition kinetics. Cells and organs are commonly bathed in flows that may contain activator or inhibitor species, while the counteracting species may be bound to cell membranes. This endows the system with the potential for inducing the above outlined instability. It should be noted that in these cases the binding of said counteracting species and/or the presence of the activator or inhibitor in the flow may be-intrinsic to (i.e. occur naturally in) the system or it/they may be artificially induced. This opens the possibility of controlling and optimizing periodic processes in physiology, immunology, microbiology, epidemiology, population ecology and developmental biology.

viii) Overall Utility

Part of the overall utility of the present Invention is to provide a general means of destabilizing a homogeneous steady state, periodic or aperiodic state of a two variable dynamical system that is characterized by activator/inhibitor kinetics by means of a differential bulk flow of the key species. This dynamical instability gives rise to periodic or aperiodic spatiotemporal structures (travelling waves). As discussed previously, the class of kinetic systems with these properties is very broad. However, it will be appreciated that systems in which these structures are induced may have multiple independent uses in process control and in production and in diagnostics and measurement.

For example, because the activation/inhibition systems to which the present invention applies comprise kinetically coupled control species, the method disclosed herein may have applicability to controlling heterogeneous catalysis, reaction pathways in heterogeneous and homogeneous reactions, reaction yields and product quality to mention just a few.

2. THREE SPECIES SYSTEMS

The analysis above showed that the first, kinetic condition for the Turing Instability (namely, the presence of an activator) must still be fulfilled for the DIFICI to occur in two species systems. This section outlines a similar linear stability analysis for the more general three variable system. It shows that the necessary conditions for the diffusive. Turing Instability remain the same as in the case of the two species system: the system must contain an unstable subsystem (an activator), and the diffusivity of the species should be sufficiently different. Moreover, if the activator is present, the system can always be destabilized by differential advection of the activator. A new and surprising feature of the analysis is that dynamical systems of three or more variables (species) do not require any activator for destabilization to occur by a differential flow of its species. This means that the class of systems that may be destabilized by the differential flow of their components to form inhomogeneous patterns is broader than the two variable case disclosed above.

Let us start with more precise definitions of the terms that are used. We shall consider a reaction-transport system $$\dot{X} = f(X) + T \quad (24)$$

where X is a vector of the system variables (i.e. species), f(X) is the kinetic term determined by the local interactions (which in chemical systems is the expression of the mass action law), and T is the transport term that involves diffusion and/or advection. Most generally T may be given as follows:

$$T = \Sigma \, D_{i,j,\alpha} \frac{\partial^2 X_j}{\partial r_\alpha^2} - V_{i,\alpha} \frac{\partial X_i}{\partial r_\alpha} \quad (25)$$

where i,j=1, ..., n,n is the number of variables, and $\alpha = 1,2,3$ labels three spatial dimensions. This corresponds to anisotropic cross-diffusion and to the advection of each species with it own velocity. We shall, however, restrict ourselves to the case of isotropic diffusion without any cross-diffusion and to the case of a single differential flow, so that a part of the components is advected with the velocity $v$ relative to the rest of the system. We also restrict ourselves to systems of three variables (n=3). Therefore, it is always possible to find a reference frame in which only one species is moving, and we shall consider only this situation. For the sake of simplicity, a spatially one-dimensional system will be considered, extended in the direction of the flow, although the linear stability analysis does not depend on the number of the spatial dimensions in this case. The transport term thus becomes $$T = D_i \partial^2 X_1 / \partial r^2 - V_i \partial X_1 / \partial r \quad (26)$$

where $V_1 = v$, $V_{2,3} = 0$.

Assume first that all spatial gradients are set zero:

$$X = f(X) \quad (27)$$

and assume that system (27) has a stable state $X_0$. The evolution of homogeneous perturbations is governed then by the linearized equation $$\dot{x} = \Sigma a_{ij} x_j, \quad (28)$$

where $X = X_0 + x$ and $a_{ij}$ is the Jacobian $\partial f(X_0)/\partial X$. Suppose that one or two variables (out of the three) of system (28) is/are kept identical zero. Then the evolution is correspondingly described by the equation $$\dot{x}_j = a_{ij} x_j + a_{ji} x_i,$$

$$\dot{x}_j = a_{ji} x_i + a_{jj} x_j \quad (29)$$

or by $$\dot{x}_j = a_{ii} x_i \quad (30)$$

(i,j=1,2,3; i<j; no summation over repeating subscripts is supposed). We shall call each equation (29) or (30) a subsystem of (28). Let us introduce the following definitions: $S = a_{11} + a_{22} + a_{33}$ is the trace of system (28), $\Delta$ is the determinant of (28), $S_{ij} = a_{ii} + a_{jj}$ (i<j) is the trace of the subsystem of $x_i$ and $x_j$, and $\Delta_{ij} = a_{ii} a_{jj} - a_{ij} a_{ji}$ (i<j) is the determinant of the subsystem of $x_i$ and $x_j$, while $\Sigma = \Delta_{12} + \Delta_{13} + \Delta_{23}$. The stability of a subsystem of a single species $x_i$, implies $a_{ii} < 0$, the stability of a subsystem of any two species $x_i$, and $x_j$ implies that both $S_{ij} < 0$ and $\Delta_{ij} > 0$. The stability of the whole system (28) entails $S < 0$ and $\Delta > 0$, and $S\Sigma - \Delta > 0$ (Hurwitz criterion, see G. A. Korn and T. M. Korn, Mathematical Handbook, (McGraw-Hill, 1968).

We shall call a subsystem (29) or (30) of system (28) an activator if it is unstable.

Let us consider now the system with differential flow but without diffusion. We shall show now that if the system contains an activator subsystem and the differential flow occurs between the activator and the rest of the system (which we call an inhibitor) then the whole system is unstable against the perturbations with sufficiently large wavenumbers k. We have to deal now with the following equation $$\dot{x}_{kj} = (a_{ij} - ikv\delta_{11}) x_{kj} \quad (31)$$

The characteristic polynomial P($\lambda$) of system (31) is complex and the Hurwitz criterion is no longer valid, We will use the Mikhailov criterion, see I. G. Aramanovich, L. E. Elsogots and G. L. Lunts, Functions of Complex Variables [Funkzii complexnogo peremennogo] (Nauka, Moskwa, 1968) instead. It can be stated as follows: Form the polynomial P(i$\omega$)=P$_R$($\omega$)+iP$_j$($\omega$), where $\omega$, P$_R$, and P$_i$ are all real. Then the necessary and sufficient conditions for the roots of P($\lambda$) to be in the left half-plane are 1. $P_i/P_R(\infty) \rightarrow -\infty$ if the power of the polynomial n is odd or $P_i/P_R(-\infty) > 0$ if n is even;
2. $P_i/P_R(+\infty) \rightarrow +\infty$ if n is add or $P_i/P_R(+\infty) < 0$ if n is even;
3. both $P_R$ and $P_i$ must have all roots real;
4. the roots of $P_R$ and $P_i$ must alternate [with a root of $P_i(P_R)$ the smallest if n is odd (even)].

For system (31) the polynomials are $$P_R(\omega) = S\omega^2 + \kappa S_{23}\omega - \Delta,$$

$$P_i(\omega) = -\omega^3 - \kappa\omega^2 + \Sigma\omega + \kappa\Delta_{23} \quad (32)$$

where $\kappa = kv$. The first two conditions Of the Mikhailov criterium are obviously fulfilled. One can easily see that $P_R(\omega)$ always has real roots. It can be also shown that at large $\kappa$, $P_i(\omega)$ has three real mots if and only if $\Delta_{23} > 0$. If $\Delta_{23}$ is positive then at large $\kappa$ the roots of the polynomial $P_R(\omega)$ can be estimated as $\omega_{i1} \approx -\sqrt{\Delta_{23}}$, $\omega_{i2} \approx \sqrt{\Delta_{23}}$, and $\omega_{i3} \approx -\kappa$, and for the polynomial $P_R(\omega) \omega_{R1} \approx \Delta/S_{23}\kappa$, $\omega_{R2} \approx -\kappa S_{23}/S$. This leads to the conclusion that the roots of the two polynomials alternate only if $S_{23} < 0$ and $0 < S_{23}/S < 1$. The last inequality holds only if $a_{11} < 0$. Summarizing, at large $\kappa$ the stability conditions break down when either the subsystem of variable $x_1$ is unstable ($a_{11}>0$) or the subsystem of variables ($x_2$, $x_3$) is unstable ($S_{23}>0$, or $\Delta_{23}<0$).

According to the Mikhailov criterion, stability is lost when any pair of roots of the $P_R(\omega)$ and $P_I(\omega)$ polynomial cross. Hence at the critical point $$P_I(\omega_{cr},\kappa_{cr})=P_R(\omega_{cr},\kappa_{cr})=0 \tag{33}$$

Excluding $\kappa_{cr}$ from eqn. (33) yields $$a_{11}\omega^4_{cr}-b\omega^2_{cr}+\Delta\Delta_{23}=0 \tag{34}$$

where $b=\Delta+a_{11}\Delta_{23}-S_{23}(\Delta_{12}+\Delta_{13})$. For the instability, quadratic (with respect to $\omega^2_{cr}$) equation (34) must have at least one positive root. This imposes the conditions:

$$b<0,\ b^2-4a_{11}\Delta\Delta_{23}>0 \tag{35}$$

One can see that these conditions may be fulfilled (e.g. at sufficiently small $|S_{23}(\Delta_{12}+\Delta_{13})|$) even if system (18) is stable and contains no activator.

If there is no activator in the system and the conditions (35) hold, equation (34) has two positive roots, $(\omega^{(1,2)}_{cr})^2$. It follows that for positive wavenumbers there is an interval of k corresponding to unstable modes, $$0<k^{(1)}_{cr}<k<k^{(2)}_{cr}$$

($k^{(1,2)}_{cr}=(\Delta-S(\omega^{(1,2)}_{cr})^2)/S_{23}\omega^{(1,2)}_{cr}$, we assume $k^{(1)}_{cr}<k^{(2)}_{cr}$). The two roots and corresponding critical wavenumbers are also possible when there is an activator (namely when $S_{23}>0$, $a_{11}<0$, $\Delta_{23}>0$). In this case, all modes with $k>k^{(1)}_{cr}$ are unstable and the second critical wavenumber, $k^{(2)}_{cr}$ corresponds to an emerging second branch of unstable modes.

Apparently, inclusion diffusion into consideration brings about the short wavelength cut-off in the dispersion relations and appearance of a critical velocity (below which no instability is possible) similarly to the case considered above for the two variable case.

We shall illustrate the differential flow destabilization of an activator free system on the Petrov-Scott-Showalter model as disclosed V. Petrov. S. K. Scott and K. Showalter, J. Chem. Phys. 97, 6191 (1992) of a chemical system. The three species model is $$\dot{x}=\mu(k+z)-xy^2-x,$$

$$\sigma\dot{y}=xy^2+x-z,$$

$$\delta\dot{z}=y-z-v\partial z/\partial r \tag{36}$$

The homogeneous steady state of the system is $$x_0=\frac{\mu k(1-\mu)}{\mu^2 k^2+(1-\mu)^2},\ y_0=z_0=\frac{\mu k}{1-\mu} \tag{37}$$

For the system parameters $\mu=0.71$, $k=0.4$, $\sigma=0.1$, $\delta=0.01$, the parameters of the linearization matrix are $a_{xx}\times-1.979$, $a_{yy}=-2.09$, $a_{zz}=-10.0$, $S=-14.07$, $\Delta=-568.5$, $S_{xy}=-4.07$, $S_{xz}=-11.98$, $S_{yz}=-12.09$, $\Delta_{xy}=195.9$, $\Delta_{xz}=19.79$, $\Delta_{yz}=20.9$. This means that the homogeneous system is stable and does not involves any activator subsystem. The condition for the flow destabilization $b=\Delta-\Sigma S_{xy}+S\Delta_{xy}=-2362<0$, $b^2-4a_{zz}\Delta\Delta_{xy}=1.125\times10^6>0$ is fulfilled however. The dispersion curve is presented in FIG. 21 and FIG. 22 shows the spatio-temporal evolution of the originally homogeneous and slightly perturbed system.

We summarize the three main points of this work: a) a necessary condition for the Turing instability in a system of three dynamical variables requires the presence of an activator; b) if there is an activator in such a system, the system can always be destabilized by a sufficiently rapid differential flow between activator and inhibitor (without diffusion, the flow may be arbitrarily slow); c) if there is no activator, the system may still be destabilized by a differential flow of its components, in contrast to systems of two dynamical variables. Intuitively, it seems reasonable that the first result, the necessary requirement for the diffusive instability holds true in a system of arbitrary number of variables. It is also clear that once the presence of an activator is not necessarily required in the system of three variables, it is not necessarily needed in systems of a larger number of variables: one could imagine the three variable system embedded into a larger system with no or weak feedback from the embedding system.

Although the illustration of the differential flow instability without an activator refers to a chemical system, similar examples can be found in physics and engineering.

The preceding discussions considered the effects of a differential flow between a subsystem and its complementary subsystem. For systems with $N>3$ variables, however, there may be several differential flows between all pairs of species, depending on the method used. Their effects are expected to be similar to, albeit more complex than a single flew. Examples are the different (inverse) retention times in chromatography and the different drift velocities of charge carriers in external fields.

Those skilled in the art will appreciate that the present invention has broad applications in biological, physical and chemical systems having kinetically coupled variables or species (restricted to activator/inhibitor variables in two variable systems but not in systems with three or more variables) and that viewing the systems in terms of its dynamic equations will clearly show the advantageous application of the DIFII in non-chemical systems and the DIFICI in chemical systems.

Therefore what is claimed is:

1. A method of destabilizing a spatially extended dynamic system having two variables which are dynamically coupled, the method comprising:
   providing a spatially extended dynamic system having two variables which are dynamically coupled with one of said two variables being an activator variable and the other being an inhibitor variable, said dynamic system being an exothermic reaction system in which said activator variable comprises heat flow generated by the exothermic reaction system and the inhibitor variable comprises mass flow of reactants and reaction products, and whereby the differential flow causing the destabilization is induced by selective retardation of the heat flow relative to a mass flow through the spatially extended system; and
   producing a differential flow in the spatially extended dynamic system between said activator variable and said inhibitor variable, and whereby the differential flow causing the destabilization is induced by selective retardation of the heat flow relative to a mass flow through the spatially extended system, the differential flow being greater than a threshold flow.

2. A method according to claim 1 wherein said mass flow is in a longitudinal direction through a reactor vessel which is packed with a porous packing medium which can absorb heat released by said reaction thereby retarding the flow of said heat relative to said longitudinal mass flow.

3. A method according to claim 2 including injecting the reactant through said reactor vessel along the length thereof in cross-flow relation to the longitudinal mass flow.

4. A method according to claim 3 wherein the porous packing medium exhibits catalytic activity.

5. A method of increasing reaction yields in a spatially extended dynamic system comprising dynamically coupled activator and inhibitor variables, the method comprising;
   providing a spatially extended dynamic system having dynamically coupled activator and inhibitor variables; and
   destabilizing the spatially extended dynamic system by inducing a differential flow between the activator and inhibitor variables, the differential flow being greater than a threshold flow.

6. A method according to claim 5 wherein the spatially extended dynamic system is selected from the group consisting of stable steady state and periodic and aperiodic biological systems, stable steady state and periodic and aperiodic chemical systems, stable steady state and periodic and aperiodic biochemical systems, stable steady state and periodic and aperiodic electrochemical systems.

7. A method of preferentially selecting a reaction channel in a reactive system having at least two variables and at least two competing reaction channels, wherein the competing reaction channels can be dynamically destabilized to varying degrees by inducing a differential flow between the at least two variables of the reactive system, the method comprising;
   providing a reactive system having at least two variables and at least two competing reaction channels; and
   inducing a differential flow between the at least two variables of the reactive system in such a way that one reaction channel is destabilized to a greater extent than the other reaction channels thereby increasing the yield and selectivity of said one reaction channel.

8. An apparatus for measuring fluid flow in a spatially extended system, comprising;
   a) providing a spatially extended system;
   b) means for injecting into said spatially extended system a dynamically coupled activator/inhibitor system;
   c) means for producing a differential flow between the activation and inhibition species, said differential flow being greater than a predeterminable threshold flow to destabilize the dynamically coupled activator and inhibitor species to produce spatiotemporal structures; and
   d) means for detecting and characterizing said spatiotemporal structures to determine the fluid flow.

9. An apparatus according to claim 8 wherein said dynamically coupled activator/inhibitor system comprises a homogeneous stable steady state.

10. An apparatus according to claim 8 wherein said dynamically coupled activator/inhibitor system comprises time periodic states.

11. A method of increasing reaction yields in a spatially extended dynamic system comprising at least three dynamically coupled variables, the method comprising:
    providing a spatially extended dynamic system having at least three variables which are dynamically coupled; and
    destabilizing the spatially extended dynamic system by inducing a differential flow between at least one of said at least three dynamically coupled variables and at least one of the remaining variables, the differential flow being greater than a threshold flow.

12. A method according to claim 11 wherein the spatially extended dynamic system is selected from the group consisting of stable steady state and periodic and aperiodic biological systems, stable steady state and periodic and aperiodic chemical systems, stable steady state and periodic and aperiodic biochemical systems, stable steady state and periodic and aperiodic electrochemical systems.

13. A method of destabilizing a spatially extended dynamic system having two variables which are dynamically coupled, the method comprising:
    providing a spatially extended dynamic system having two variables which are dynamically coupled with one of said two variables being an activator variable and the other being an inhibitor variable and said spatially extended system comprises an open support structure; and
    producing a differential flow in the spatially extended dynamic system between said activator variable and said inhibitor variable, the differential flow being greater than a threshold flow, whereby the differential flow is achieved by partially immobilizing one of said activator and inhibitor variables is said open support structure and moving the other variable through said open support structure relative to said partially immobilized variable.

14. A method of destabilizing a spatially extended dynamic system having at least three variables which are dynamically coupled, the method comprising:
    providing a spatially extended dynamic system having at least three variables which are dynamically coupled; and
    producing a differential flow in the spatially extended dynamic system between at least one of said at least three variables and at least one of the remaining at least three variables, the differential flow being greater than a threshold flow.

15. A method according to claim 14 wherein at least one of said at least three variables is an activator variable and whereby the differential flow is induced between said activator variable and at least one of the other variables.

16. A method according to claim 15 in which the chemical system is an exothermic reaction system, wherein said activator variable comprises heat flow generated by the exothermic reaction system, and whereby the differential flow causing the destabilization is induced by selective retardation of the heat flow relative to a mass flow through the spatially extended system.

17. A method according to claim 16 wherein said mass flow is in a longitudinal direction through a chemical reactor vessel which is packed with a porous packing medium which can absorb hem released by said reaction thereby retarding the flow of said heat relative to said longitudinal mass flow.

18. A method according to claim 17 including injecting the chemical reactant through said chemical reactor vessel along the length thereof in cross-flow relation to the longitudinal mass flow.

19. A method according to claim 18 wherein the porous packing medium exhibits catalytic activity.

20. A method according to claim 15 wherein said spatially extended system comprises an open support structure through which a fluid can flow, wherein the differential flow is achieved by partially immobilizing one of said activator and the at least one of the other variables in said open support structure and moving the other variable through said open support structure relative to said immobilized variable.

21. A method according to claim 15 wherein said spatially extended system comprises an open support structure through which a fluid can flow, wherein the differential flow is achieved by immobilizing one of said activator and the at least one other variable in said open support structure and moving the other variable through said open support structure relative to said immobilized variable.

22. A method according to claim 15 wherein said physical system is a semiconducting system, including means for inducing a differential flow between said activator and the at least one of the other variables.

23. A method according to claim 22 wherein said means for inducing the differential flow is an electric field.

24. A method according to claim 22 wherein said means for inducing the differential flow is a magnetic field.

25. A method according to claim 22 wherein said means for inducing the differential flow is a temperature gradient.

26. A method according to claim 15 wherein said physical system is a superconducting system, including means for inducing a differential flow between said activator and the at least one of the other variables.

27. A method according to claim 26 wherein said means for inducing a differential flow is an electric field.

28. A method according to claim 26 wherein said means for inducing a differential flow is a magnetic field.

29. A method according to claim 26 wherein said means for inducing a differential flow is a temperature gradient.

30. A method according to claim 14 in which the chemical system is an exothermic reaction system, wherein one of said variables comprises heat flow generated by the exothermic reaction system and another of said variables is a mass flow through the spatially extended system, and whereby the differential flow causing the destabilization is induced by selective retardation of the heat flow relative to the mass flow through the spatially extended system.

31. A method according to claim 30 wherein said mass flow is in a longitudinal direction through a chemical reactor vessel which is packed with a porous packing medium which can absorb heat released by said reaction thereby retarding the flow of said heat relative to said longitudinal mass flow.

32. A method according to claim 31 including injecting the chemical reactant through said chemical reactor vessel along the length thereof in cross-flow relation to the longitudinal mass flow.

33. A method according to claim 32 wherein the porous packing medium exhibits catalytic activity.

34. A method according to claim 14 wherein said spatially extended system comprises an open support structure through which a fluid can flow, wherein the differential flow is achieved by partially immobilizing at least one of said variables and moving at least one of the other variables through said open support structure relative to said immobilized variable.

35. A method according to claim 14 wherein said spatially extended system comprises an open support structure through which a fluid can flow, wherein the differential flow is achieved by immobilizing one of said variables in said open support structure and moving at least one of the other variables through said open support structure relative to said immobilized variable.

36. A method according to claim 14 wherein said physical system is a semiconducting system, including means for inducing a differential flow between at least one of the variables and at least one of the remaining variables.

37. A method according to claim 36 wherein said means for inducing the differential flow is an electric field.

38. A method according to claim 36 wherein said means for inducing the differential flow is a magnetic field.

39. A method according to claim 36 wherein said means for inducing the differential flow is a temperature gradient.

40. A method according to claim 14 wherein said physical system is a superconducting system, including means for inducing a differential flow between said at least one of the variables and at least one of the remaining variables.

41. A method according to claim 40 wherein said means for inducing a differential flow is an electric field.

42. A method according to claim 40 wherein said means for inducing a differential flow is a magnetic field.

43. A method according to claim 40 wherein said means for inducing a differential flow is a temperature gradient.

* * * * *